US 8,243,089 B2

(12) United States Patent
Marks et al.

(10) Patent No.: US 8,243,089 B2
(45) Date of Patent: *Aug. 14, 2012

(54) IMPLEMENTING LIGHTING CONTROL OF A USER ENVIRONMENT

(75) Inventors: Richard Marks, Pleasanton, CA (US); Gary M. Zalewski, Oakland, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/019,231

(22) Filed: Feb. 1, 2011

(65) Prior Publication Data
US 2011/0205240 A1 Aug. 25, 2011

Related U.S. Application Data

(63) Continuation of application No. 11/744,816, filed on May 4, 2007, now Pat. No. 7,880,746, which is a continuation-in-part of application No. 11/624,886, filed on Jan. 19, 2007.

(60) Provisional application No. 60/798,112, filed on May 4, 2006.

(51) Int. Cl.
G09G 5/02 (2006.01)
G06T 15/50 (2011.01)

(52) U.S. Cl. ..................................... 345/589; 345/426

(58) Field of Classification Search .......... 345/589–628; 348/207.99–376
See application file for complete search history.

(56) References Cited

U.S. PATENT DOCUMENTS

| 3,147,341 A | 9/1964 | Gibson |
| 3,200,193 A | 8/1965 | Eiggs |
| 3,717,345 A | 2/1973 | Banville |
| 3,943,277 A | 3/1976 | Everly et al. |
| 4,051,520 A | 9/1977 | Davidse et al. |
| 4,068,847 A | 1/1978 | Lukkarila et al. |
| 4,090,216 A | 5/1978 | Constable |
| 4,116,444 A | 9/1978 | Mayer et al. |
| 4,133,004 A | 1/1979 | Fitts |
| 4,241,341 A | 12/1980 | Thorson |
| 4,321,635 A | 3/1982 | Tsuyuguchi |
| 4,355,334 A | 10/1982 | Fitzgibbon et al. |
| 4,361,850 A | 11/1982 | Nishimura |
| 4,448,200 A | 5/1984 | Brooks et al. |
| 4,514,727 A | 4/1985 | Van Antwerp |

(Continued)

FOREIGN PATENT DOCUMENTS
CN 1201180 12/1998
(Continued)

OTHER PUBLICATIONS

Agui, Takeshi et al., "Computer Graphics", Shokodo Co., Ltd., Jul. 1992, 1st ed., pp. 80-101 (Environment Mapping).

(Continued)

*Primary Examiner* — Ryan R Yang
(74) *Attorney, Agent, or Firm* — Carr & Ferrell LLP

(57) ABSTRACT

A system and method for controlling lighting conditions in a user environment whereby bandwidth consumption may be managed is disclosed. An inner frame area and an outer frame area adjust certain lighting conditions in the user environment in response to certain lighting conditions detected by the image capture device as those conditions affect bandwidth consumption during transmission of the image capture data. The frame areas may be dynamically controlled as to affect the brightness and/or color of the particular user environment.

36 Claims, 7 Drawing Sheets

U.S. PATENT DOCUMENTS

| | | |
|---|---|---|
| 4,533,937 A | 8/1985 | Yamamoto et al. |
| 4,646,075 A | 2/1987 | Andrews et al. |
| 4,649,504 A | 3/1987 | Krouglicof et al. |
| 4,658,247 A | 4/1987 | Gharachorloo |
| 4,672,564 A | 6/1987 | Egli et al. |
| 4,675,562 A | 6/1987 | Herlein et al. |
| 4,677,569 A | 6/1987 | Nakano et al. |
| 4,683,466 A | 7/1987 | Holtey et al. |
| 4,685,054 A | 8/1987 | Manninen et al. |
| 4,685,146 A | 8/1987 | Fenster et al. |
| 4,709,231 A | 11/1987 | Sakaibara et al. |
| 4,727,365 A | 2/1988 | Bunker et al. |
| 4,737,921 A | 4/1988 | Goldwasser et al. |
| 4,757,525 A | 7/1988 | Matthews et al. |
| 4,807,158 A | 2/1989 | Blanton et al. |
| 4,817,005 A | 3/1989 | Kubota et al. |
| 4,843,568 A | 6/1989 | Krueger et al. |
| 4,860,197 A | 8/1989 | Langendorf et al. |
| 4,864,515 A | 9/1989 | Deck |
| 4,866,637 A | 9/1989 | Gonzalez-Lopez et al. |
| 4,901,064 A | 2/1990 | Deering |
| 4,905,147 A | 2/1990 | Logg |
| 4,905,168 A | 2/1990 | McCarthy et al. |
| 4,933,864 A | 6/1990 | Evans, Jr. et al. |
| 4,934,908 A | 6/1990 | Turrell et al. |
| 4,942,538 A | 7/1990 | Yuan et al. |
| 4,943,938 A | 7/1990 | Aoshima et al. |
| 4,952,917 A | 8/1990 | Yabuuchi |
| 4,956,794 A | 9/1990 | Zeevi et al. |
| 4,962,540 A | 10/1990 | Tsujiuchi et al. |
| 4,969,036 A | 11/1990 | Bhanu et al. |
| 4,980,823 A | 12/1990 | Liu |
| 5,014,327 A | 5/1991 | Potter et al. |
| 5,034,986 A | 7/1991 | Karmann et al. |
| 5,045,843 A | 9/1991 | Hansen |
| 5,057,744 A | 10/1991 | Barbier et al. |
| 5,064,291 A | 11/1991 | Reiser |
| 5,067,014 A | 11/1991 | Bergen et al. |
| 5,128,671 A | 7/1992 | Thomas, Jr. |
| 5,128,794 A | 7/1992 | Mocker et al. |
| 5,162,781 A | 11/1992 | Cambridge |
| 5,194,941 A | 3/1993 | Grimaldi et al. |
| 5,208,763 A | 5/1993 | Hong et al. |
| 5,212,888 A | 5/1993 | Cary et al. |
| 5,222,203 A | 6/1993 | Obata |
| 5,227,985 A | 7/1993 | DeMenthon |
| 5,230,623 A | 7/1993 | Guthrie et al. |
| 5,253,339 A | 10/1993 | Wells et al. |
| 5,265,888 A | 11/1993 | Yamamoto et al. |
| 5,268,996 A | 12/1993 | Steiner et al. |
| 5,269,687 A | 12/1993 | Mott et al. |
| 5,274,560 A | 12/1993 | LaRue |
| 5,297,061 A | 3/1994 | Dementhon et al. |
| 5,305,389 A | 4/1994 | Palmer |
| 5,307,137 A | 4/1994 | Jones et al. |
| 5,335,557 A | 8/1994 | Yasutake |
| 5,351,090 A | 9/1994 | Nakamura |
| 5,354,202 A | 10/1994 | Moncrief et al. |
| 5,361,147 A | 11/1994 | Katayama et al. |
| 5,363,120 A | 11/1994 | Drumm |
| 5,366,376 A | 11/1994 | Copperman et al. |
| 5,367,615 A | 11/1994 | Economy et al. |
| 5,369,737 A | 11/1994 | Gholizadeh et al. |
| 5,387,943 A | 2/1995 | Silver |
| 5,446,714 A | 8/1995 | Yoshio et al. |
| 5,446,798 A | 8/1995 | Morita et al. |
| 5,448,687 A | 9/1995 | Hoogerhyde et al. |
| 5,450,504 A | 9/1995 | Calia |
| 5,469,193 A | 11/1995 | Giobbi et al. |
| 5,473,736 A | 12/1995 | Young |
| 5,526,041 A | 6/1996 | Glatt |
| 5,534,917 A | 7/1996 | MacDougall |
| 5,537,638 A | 7/1996 | Morita et al. |
| 5,548,667 A | 8/1996 | Tu |
| 5,550,960 A | 8/1996 | Shirman et al. |
| 5,555,532 A | 9/1996 | Sacha |
| 5,557,684 A | 9/1996 | Wang et al. |
| 5,559,950 A | 9/1996 | Cannon |
| 5,563,989 A | 10/1996 | Billyard |
| 5,572,261 A | 11/1996 | Cooper |
| 5,574,836 A | 11/1996 | Broemmelsiek |
| 5,577,179 A | 11/1996 | Blank |
| 5,577,913 A | 11/1996 | Moncrief et al. |
| 5,586,231 A | 12/1996 | Florent et al. |
| 5,590,248 A | 12/1996 | Zarge et al. |
| 5,598,297 A | 1/1997 | Yamanaka et al. |
| 5,611,000 A | 3/1997 | Szeliski et al. |
| 5,616,078 A | 4/1997 | Oh |
| 5,617,407 A | 4/1997 | Bareis |
| 5,630,033 A | 5/1997 | Purcell et al. |
| 5,631,697 A | 5/1997 | Nishimura et al. |
| 5,647,019 A | 7/1997 | Iino et al. |
| 5,649,032 A | 7/1997 | Burt et al. |
| 5,659,671 A | 8/1997 | Tannenbaum et al. |
| 5,660,547 A | 8/1997 | Copperman |
| 5,668,646 A | 9/1997 | Katayama et al. |
| 5,672,820 A | 9/1997 | Rossi et al. |
| 5,673,374 A | 9/1997 | Sakaibara et al. |
| 5,680,487 A | 10/1997 | Markandey |
| 5,684,887 A | 11/1997 | Lee et al. |
| 5,699,497 A | 12/1997 | Erdahl et al. |
| 5,704,024 A | 12/1997 | Voorhies et al. |
| 5,717,148 A | 2/1998 | Ely et al. |
| 5,717,848 A | 2/1998 | Watanabe et al. |
| 5,734,384 A | 3/1998 | Yanof et al. |
| 5,748,865 A | 5/1998 | Yamamoto et al. |
| 5,748,867 A | 5/1998 | Cosman et al. |
| 5,751,928 A | 5/1998 | Bakalash |
| 5,756,354 A | 5/1998 | Tzidon et al. |
| 5,757,360 A | 5/1998 | Nitta et al. |
| 5,760,781 A | 6/1998 | Kaufman et al. |
| 5,761,401 A | 6/1998 | Kobayashi et al. |
| 5,764,803 A | 6/1998 | Jacquin et al. |
| 5,769,718 A | 6/1998 | Rieder |
| 5,774,124 A | 6/1998 | Itoh et al. |
| 5,781,194 A | 7/1998 | Ponomarev et al. |
| 5,786,801 A | 7/1998 | Ichise |
| 5,793,376 A | 8/1998 | Tanaka et al. |
| 5,798,519 A | 8/1998 | Vock et al. |
| 5,805,170 A | 9/1998 | Burch |
| 5,805,745 A | 9/1998 | Graf |
| 5,805,782 A | 9/1998 | Foran |
| 5,808,617 A | 9/1998 | Kenworthy et al. |
| 5,808,619 A | 9/1998 | Choi et al. |
| 5,812,136 A | 9/1998 | Keondjian |
| 5,812,141 A | 9/1998 | Kamen et al. |
| 5,818,424 A | 10/1998 | Korth |
| 5,818,553 A | 10/1998 | Koenck et al. |
| 5,825,308 A | 10/1998 | Rosenberg |
| 5,831,623 A | 11/1998 | Negishi et al. |
| 5,852,443 A | 12/1998 | Kenworthy |
| 5,854,632 A | 12/1998 | Steiner |
| 5,856,844 A | 1/1999 | Batterman et al. |
| 5,864,342 A | 1/1999 | Kajiya et al. |
| 5,864,742 A | 1/1999 | Gasper et al. |
| 5,870,097 A | 2/1999 | Snyder et al. |
| 5,870,098 A | 2/1999 | Gardiner |
| 5,880,736 A | 3/1999 | Peercy et al. |
| 5,880,856 A | 3/1999 | Ferriere |
| 5,889,505 A | 3/1999 | Toyama et al. |
| 5,890,122 A | 3/1999 | Van Kleeck et al. |
| 5,894,308 A | 4/1999 | Isaacs |
| 5,899,810 A | 5/1999 | Smith |
| 5,903,318 A | 5/1999 | Demay et al. |
| 5,905,894 A | 5/1999 | De Bonet |
| 5,912,830 A | 6/1999 | Krech, Jr. et al. |
| 5,913,727 A | 6/1999 | Ahdoot |
| 5,914,724 A | 6/1999 | Deering et al. |
| 5,915,972 A | 6/1999 | Tada |
| 5,917,937 A | 6/1999 | Szeliski et al. |
| 5,922,318 A | 7/1999 | Bandman et al. |
| 5,923,381 A | 7/1999 | Demay et al. |
| 5,929,860 A | 7/1999 | Hoppe |
| 5,933,150 A | 8/1999 | Ngo et al. |
| 5,933,535 A | 8/1999 | Lee et al. |
| 5,935,198 A | 8/1999 | Blomgren |
| 5,949,424 A | 9/1999 | Cabral et al. |

| | | |
|---|---|---|
| 5,953,485 A | 9/1999 | Abecassis |
| 5,959,673 A | 9/1999 | Lee et al. |
| 5,963,209 A | 10/1999 | Hoppe |
| 5,966,133 A | 10/1999 | Hoppe |
| 5,977,977 A | 11/1999 | Kajiya et al. |
| 5,982,352 A | 11/1999 | Pryor |
| 5,982,390 A | 11/1999 | Stoneking et al. |
| 5,986,668 A | 11/1999 | Szeliski et al. |
| 5,987,164 A | 11/1999 | Szeliski et al. |
| 5,990,901 A | 11/1999 | Lawton et al. |
| 6,002,738 A | 12/1999 | Cabral et al. |
| 6,009,188 A | 12/1999 | Cohen et al. |
| 6,009,190 A | 12/1999 | Szeliski et al. |
| 6,010,403 A | 1/2000 | Adam et al. |
| 6,016,150 A | 1/2000 | Lengyel et al. |
| 6,018,347 A | 1/2000 | Willis |
| 6,018,349 A | 1/2000 | Szeliski et al. |
| 6,023,523 A | 2/2000 | Cohen et al. |
| 6,026,182 A | 2/2000 | Lee et al. |
| 6,031,934 A | 2/2000 | Ahmad et al. |
| 6,034,691 A | 3/2000 | Aono et al. |
| 6,034,692 A | 3/2000 | Gallery et al. |
| 6,034,693 A | 3/2000 | Kobayashi et al. |
| 6,035,067 A | 3/2000 | Ponticos |
| 6,037,947 A | 3/2000 | Nelson et al. |
| 6,040,842 A | 3/2000 | Wavish et al. |
| 6,044,181 A | 3/2000 | Szeliski et al. |
| 6,046,744 A | 4/2000 | Hoppe |
| 6,049,619 A | 4/2000 | Anandan et al. |
| 6,049,636 A | 4/2000 | Yang |
| 6,058,397 A | 5/2000 | Barrus et al. |
| 6,072,494 A | 6/2000 | Nguyen |
| 6,072,504 A | 6/2000 | Segen |
| 6,081,274 A | 6/2000 | Shiraishi |
| 6,100,898 A | 8/2000 | Malamy et al. |
| 6,101,289 A | 8/2000 | Kellner |
| 6,121,953 A | 9/2000 | Walker |
| 6,130,673 A | 10/2000 | Pulli et al. |
| 6,137,492 A | 10/2000 | Hoppe |
| 6,141,013 A | 10/2000 | Nelson et al. |
| 6,141,041 A | 10/2000 | Carlbom et al. |
| 6,155,924 A | 12/2000 | Nakagawa et al. |
| 6,157,386 A | 12/2000 | Wilde |
| 6,162,123 A | 12/2000 | Woolston |
| 6,172,354 B1 | 1/2001 | Adan et al. |
| 6,175,367 B1 | 1/2001 | Parikh et al. |
| 6,181,384 B1 | 1/2001 | Kurashige et al. |
| 6,181,988 B1 | 1/2001 | Schneider et al. |
| 6,200,138 B1 | 3/2001 | Ando et al. |
| 6,201,581 B1 | 3/2001 | Moriwake et al. |
| 6,203,426 B1 | 3/2001 | Matsui et al. |
| 6,208,347 B1 | 3/2001 | Migdal et al. |
| 6,220,962 B1 | 4/2001 | Miyamoto et al. |
| 6,222,555 B1 | 4/2001 | Christofferson et al. |
| 6,229,553 B1 | 5/2001 | Duluk, Jr. et al. |
| 6,233,291 B1 | 5/2001 | Shukhman et al. |
| 6,252,608 B1 | 6/2001 | Snyder et al. |
| 6,268,875 B1 | 7/2001 | Duluk, Jr. et al. |
| 6,273,814 B1 | 8/2001 | Komoto |
| 6,288,730 B1 | 9/2001 | Duluk, Jr. et al. |
| 6,313,841 B1 | 11/2001 | Ogata et al. |
| 6,313,842 B1 | 11/2001 | Tampieri |
| 6,319,129 B1 | 11/2001 | Igarashi et al. |
| 6,320,580 B1 | 11/2001 | Yasui et al. |
| 6,330,000 B1 | 12/2001 | Fenney et al. |
| 6,331,851 B1 | 12/2001 | Suzuki et al. |
| 6,342,885 B1 | 1/2002 | Knittel et al. |
| 6,348,921 B1 | 2/2002 | Zhao et al. |
| 6,353,272 B1 | 3/2002 | van der Hoeven |
| 6,356,263 B2 | 3/2002 | Migdal et al. |
| 6,356,288 B1 | 3/2002 | Freeman et al. |
| 6,361,438 B1 | 3/2002 | Morihira |
| 6,366,272 B1 | 4/2002 | Rosenberg et al. |
| 6,392,647 B1 | 5/2002 | Migdal et al. |
| 6,396,490 B1 | 5/2002 | Gorman |
| 6,400,842 B2 | 6/2002 | Fukuda |
| 6,411,298 B1 | 6/2002 | Goto et al. |
| 6,414,960 B1 | 7/2002 | Kuhn et al. |
| 6,417,836 B1 | 7/2002 | Kumar et al. |
| 6,421,057 B1 | 7/2002 | Lauer et al. |
| 6,426,720 B1 | 7/2002 | Ross et al. |
| 6,426,755 B1 | 7/2002 | Deering |
| 6,456,977 B1 | 9/2002 | Wang |
| 6,476,807 B1 | 11/2002 | Duluk, Jr. et al. |
| 6,488,505 B1 | 12/2002 | Hightower |
| 6,489,955 B1 | 12/2002 | Newhall, Jr. |
| 6,496,189 B1 | 12/2002 | Yaron et al. |
| 6,496,598 B1 | 12/2002 | Harman |
| 6,504,538 B1 | 1/2003 | Freund et al. |
| 6,529,206 B1 | 3/2003 | Ohki et al. |
| 6,529,875 B1 | 3/2003 | Nakajima et al. |
| 6,538,666 B1 | 3/2003 | Ozawa et al. |
| 6,545,663 B1 | 4/2003 | Arbter et al. |
| 6,554,707 B1 | 4/2003 | Sinclair et al. |
| 6,563,499 B1 | 5/2003 | Waupotitsch et al. |
| 6,571,208 B1 | 5/2003 | Kuhn et al. |
| 6,572,475 B1 | 6/2003 | Okabe et al. |
| 6,573,890 B1 | 6/2003 | Lengyel |
| 6,577,312 B2 | 6/2003 | Deering et al. |
| 6,578,197 B1 | 6/2003 | Peercy et al. |
| 6,585,599 B1 | 7/2003 | Horigami et al. |
| 6,594,388 B1 | 7/2003 | Gindele et al. |
| 6,597,363 B1 | 7/2003 | Duluk, Jr. et al. |
| 6,611,265 B1 | 8/2003 | Hong et al. |
| 6,639,594 B2 | 10/2003 | Zhang et al. |
| 6,646,639 B1 | 11/2003 | Greene et al. |
| 6,646,640 B2 | 11/2003 | Nagy |
| 6,650,329 B1 | 11/2003 | Koike |
| 6,652,376 B1 | 11/2003 | Yoshida et al. |
| 6,664,955 B1 | 12/2003 | Deering |
| 6,664,959 B2 | 12/2003 | Duluk, Jr. et al. |
| 6,680,746 B2 | 1/2004 | Kawai et al. |
| 6,686,924 B1 | 2/2004 | Mang et al. |
| 6,714,236 B1 | 3/2004 | Wada et al. |
| 6,717,576 B1 | 4/2004 | Duluk, Jr. et al. |
| 6,717,579 B1 | 4/2004 | Deslandes et al. |
| 6,717,599 B1 | 4/2004 | Olano |
| 6,720,949 B1 | 4/2004 | Pryor et al. |
| 6,738,059 B1 | 5/2004 | Yoshinaga et al. |
| 6,744,442 B1 | 6/2004 | Chan et al. |
| 6,750,867 B1 | 6/2004 | Gibson |
| 6,755,654 B2 | 6/2004 | Hightower |
| 6,771,264 B1 | 8/2004 | Duluk |
| 6,771,813 B1 | 8/2004 | Katsuyama |
| 6,778,181 B1 | 8/2004 | Kilgariff et al. |
| 6,781,594 B2 | 8/2004 | Day |
| 6,795,068 B1 | 9/2004 | Marks |
| 6,798,411 B1 | 9/2004 | Gorman et al. |
| 6,803,910 B2 | 10/2004 | Pfister et al. |
| 6,803,964 B1 | 10/2004 | Post et al. |
| 6,807,296 B2 | 10/2004 | Mishima |
| 6,825,851 B1 | 11/2004 | Leather |
| 6,850,236 B2 | 2/2005 | Deering |
| 6,850,243 B1 | 2/2005 | Kilgariff et al. |
| 6,853,382 B1 | 2/2005 | Van Dyke et al. |
| 6,854,632 B2 | 2/2005 | Larsson |
| 6,864,895 B1 | 3/2005 | Tidwell et al. |
| 6,903,738 B2 | 6/2005 | Pfister et al. |
| 6,912,010 B2 | 6/2005 | Baker et al. |
| 6,917,692 B1 | 7/2005 | Murching et al. |
| 6,928,433 B2 | 8/2005 | Goodman et al. |
| 6,956,871 B2 | 10/2005 | Wang et al. |
| 6,962,527 B2 | 11/2005 | Baba |
| 6,995,788 B2 | 2/2006 | James |
| 7,006,101 B1 | 2/2006 | Brown et al. |
| 7,072,792 B2 | 7/2006 | Freifeld |
| 7,079,138 B2 | 7/2006 | Day |
| 7,081,893 B2 | 7/2006 | Cerny |
| 7,085,722 B2 | 8/2006 | Luisi |
| 7,101,284 B2 | 9/2006 | Kake et al. |
| 7,113,193 B2 | 9/2006 | Marks |
| 7,162,314 B2 | 1/2007 | Fay et al. |
| 7,180,529 B2 | 2/2007 | Covannon et al. |
| 7,214,133 B2 | 5/2007 | Jen et al. |
| 7,233,904 B2 | 6/2007 | Luisi |
| 7,251,315 B1 | 7/2007 | Quinton |
| 7,293,235 B1 | 11/2007 | Powers et al. |
| 7,304,667 B2 * | 12/2007 | Watanabe et al. .......... 348/221.1 |

| | | |
|---|---|---|
| 7,333,150 B2 | 2/2008 | Cooper |
| 7,339,589 B2 | 3/2008 | Annunziata |
| 7,589,723 B2 | 9/2009 | Wang et al. |
| 7,636,126 B2 | 12/2009 | Mallinson |
| 7,777,746 B2 | 8/2010 | Annunziata |
| 7,877,262 B2 | 1/2011 | Luisi |
| 7,880,746 B2 | 2/2011 | Marks et al. |
| 7,920,209 B2 | 4/2011 | Mallinson |
| 2001/0048434 A1 | 12/2001 | Brown |
| 2002/0018063 A1 | 2/2002 | Donovan et al. |
| 2002/0041335 A1 | 4/2002 | Taraci et al. |
| 2002/0047937 A1 | 4/2002 | Wells |
| 2002/0068626 A1 | 6/2002 | Takeda et al. |
| 2002/0080136 A1 | 6/2002 | Kouadio |
| 2002/0107070 A1 | 8/2002 | Nagy |
| 2002/0130866 A1 | 9/2002 | Stuttard |
| 2002/0140703 A1 | 10/2002 | Baker et al. |
| 2002/0162081 A1 | 10/2002 | Solomon |
| 2002/0167518 A1 | 11/2002 | Migdal et al. |
| 2003/0009748 A1 | 1/2003 | Glanville et al. |
| 2003/0043163 A1 | 3/2003 | Day |
| 2003/0058238 A1 | 3/2003 | Doak et al. |
| 2003/0112238 A1 | 6/2003 | Cerny et al. |
| 2003/0117391 A1 | 6/2003 | Olano |
| 2003/0142232 A1 | 7/2003 | Albean |
| 2003/0179220 A1 | 9/2003 | Dietrich, Jr. et al. |
| 2004/0003370 A1 | 1/2004 | Schenk et al. |
| 2004/0051716 A1 | 3/2004 | Sevigny |
| 2004/0056860 A1 | 3/2004 | Collodi |
| 2004/0100582 A1 | 5/2004 | Stanger |
| 2004/0130550 A1 | 7/2004 | Blanco et al. |
| 2004/0130552 A1 | 7/2004 | Duluk, Jr. et al. |
| 2004/0263636 A1 | 12/2004 | Cutler et al. |
| 2004/0268413 A1 | 12/2004 | Reid et al. |
| 2005/0001836 A1 | 1/2005 | Day |
| 2005/0019020 A1 | 1/2005 | Sato et al. |
| 2005/0024379 A1 | 2/2005 | Marks |
| 2005/0078116 A1 | 4/2005 | Sloan et al. |
| 2005/0090312 A1 | 4/2005 | Campbell |
| 2005/0243094 A1 | 11/2005 | Patel et al. |
| 2005/0253965 A1 | 11/2005 | Cooper |
| 2006/0015348 A1 | 1/2006 | Cooper et al. |
| 2006/0039017 A1 | 2/2006 | Park et al. |
| 2006/0071933 A1 | 4/2006 | Green et al. |
| 2006/0209210 A1 | 9/2006 | Swan et al. |
| 2006/0290810 A1 | 12/2006 | Mallinson |
| 2007/0106760 A1 | 5/2007 | Houh et al. |
| 2007/0257928 A1 | 11/2007 | Marks et al. |
| 2007/0279427 A1 | 12/2007 | Marks |
| 2008/0070655 A1 | 3/2008 | Tanabe |
| 2008/0268956 A1 | 10/2008 | Suzuki |
| 2009/0040222 A1 | 2/2009 | Green et al. |
| 2009/0193453 A1 | 7/2009 | Cansler et al. |
| 2010/0029387 A1 | 2/2010 | Luisi |
| 2010/0053430 A1 | 3/2010 | Mallinson |
| 2011/0181776 A1 | 7/2011 | Mallinson |
| 2011/0205240 A1 | 8/2011 | Marks et al. |
| 2011/0249072 A1 | 10/2011 | Marks |

FOREIGN PATENT DOCUMENTS

| | | |
|---|---|---|
| DE | 19905076 | 5/2000 |
| EP | 448411 | 9/1991 |
| EP | 615386 | 9/1994 |
| EP | 789296 | 8/1997 |
| EP | 1029569 | 8/2000 |
| EP | 1630754 | 3/2006 |
| EP | 1650706 | 4/2006 |
| EP | 850673 | 12/2009 |
| GB | 2351637 | 1/2001 |
| GB | 2411065 | 8/2005 |
| JP | 59-002040 | 1/1984 |
| JP | 59-202779 | 11/1984 |
| JP | 61-131110 | 6/1986 |
| JP | H527779 | 4/1993 |
| JP | 6266854 | 9/1994 |
| JP | 7-160412 | 6/1995 |
| JP | 2007271999 | 10/1995 |
| JP | 2007334664 | 12/1995 |
| JP | 9265379 | 10/1997 |
| JP | 10055454 | 2/1998 |
| JP | 11070273 | 3/1999 |
| JP | 2000137828 | 5/2000 |
| JP | 2000311251 | 7/2000 |
| JP | 2000218036 | 8/2000 |
| JP | 2000233072 A | 8/2000 |
| JP | 2000237453 A | 9/2000 |
| JP | 200338993 | 12/2000 |
| JP | 2001029649 | 2/2001 |
| JP | 3244798 | 10/2001 |
| JP | 2002159749 | 6/2002 |
| JP | 2001079263 | 3/2003 |
| JP | 2008165784 | 7/2008 |
| JP | 4616330 | 10/2010 |
| KR | 200072753 | 12/2000 |
| WO | 9418790 | 8/1994 |
| WO | 9802223 | 1/1998 |
| WO | 9853443 | 11/1998 |
| WO | 0010130 | 2/2000 |
| WO | 2004129768 | 4/2004 |
| WO | 2005040900 | 5/2005 |
| WO | 2006033360 | 3/2006 |
| WO | 2008018943 A1 | 2/2008 |
| WO | 2008058271 A2 | 5/2008 |
| WO | 2008058271 A3 | 8/2008 |
| WO | 01082626 | 11/2011 |

OTHER PUBLICATIONS

Aguilera, S et al., "Impaired Persons Facilities Based on a Multi-Modality Speech Processing System", Proc. On Speech & Language Tech., 1993.

Appeal Brief filed Feb. 1, 2008 for U.S. Appl. No. 10/959,695.

Appeal Brief filed Jun. 16, 2008 for U.S. Appl. No. 10/959,695.

Arons, B., "Authoring and Transcription Tools for Speech-Based Hypermedia", Proc. Of American Voice I/O Society, 1991.

Arons, B., "Hyperspeech: Navigating in Speech-Only Hypermedia", Proc. Of Hypertext, 1991.

Auslander et al., "Fast, Effective Dynamic Compilation," SIGPLAN Notices ACM, 1996.

Balakrishnan et al., "Exploring Interactive Curve and Surface Manipulation Using a Bend and Twist Sensitive Input Strip," Proc. Of 1999 ACM symp. On Interactive 3D Graphics.

Balakrishnan et al., "Performance Differences in the Fingers, Wrist, and Forearm in Computer Input Control," Proc. Of 1997 ACM Conf. on Human Factors in Computing Systems.

Balakrishnan et al., "The PadMouse: Facilitating Selection and Spatial Postioning for the Non-Dominant Hand," Proc. Of 1998 ACM Conf. on Human Factors in Computing Systems.

Balakrsihnan et al., Exploring Bimanual Camera Control and Object Manipulation in 3D Graphics Interfaces,: Proc. Of 1999 ACM Conf. on Human Factors in Computing Systems.

Bates, Jason, "Half-Life Review," IGN, Nov. 25, 1998.

Bennacef, S.K., "A Spoken Language System for Information Retrieval", Proc. Of ICSLP, 1994.

Beshers et al., "Generating Efficient Virtual Worlds for Visualization Using Partial Evaluation and Dynamic Compilation," ACM 1997.

Blinn, J.F. et al., "Texture and Reflection in Computer Generated Images", Communications of the Association for Computing Machinery, ACM, Oct. 1, 1976, pp. 542-547, vol. 19, No. 10, New York, NY USA.

Blinn, J.F., "Light Reflection Functions for Simulation of Clouds and Dusty Surfaces," ACM Graphics, vol. 16, No. 3, Jul. 1982.

Blinn, J.F., "Models of Light Reflection for Computer Synthesized Pictures", Proc. Siggraph 1977, Computer Graphics 11(2), pp. 92-198, Jul. 1977.

Chan, E., Ng R., Sen P., Proudfoot, K., and Hanarahan, P. 2002. Efficient Partioning of fragment shaders for multipass rendering on programmable graphics hardware. In Proceedings of the ACM SIGGRAPH/EUROGRAPHICS Conference on Graphics Hardware (Sarrbrucken, Germany, Sep. 1-2, 2002).

Davenport, G. et al., "Cinematic Primitives for Multimedia", IEEE Computer Graphics and Applications (Aug. 1991), vol. 11, No. 4, pp. 67-74.

Dorsey, Julie O'B et al., Design and Simultaion of Opera Lighting and Projection Effects, Program of Computer Graphics, Computer Graphics, Jul. 1991, vol. 25, No. 4, New York.

European Examination Report mailed Jul. 27, 2010 in European patent application No. 04 256 331.2, filed Oct. 14, 2004.

Examiner's Answer to Appeal Brief, Apr. 14, 2008.

Fernando R. and Kilgard M. J. 2003 The Cg Tutorial:the Definitve Guide to Programmable Real-Time Graphics. Addison-Wesley Longman Publishing Co., Inc., in Ch. 1 sections 1.2 and 1.4, in Appendix C section C.2.

Fitzmaurice et al., "Sampling, Synthesis, and Input Devices," Communications of the ACM, vol. 42, No. *, Aug. 1999.

Foley et al., "Computer Graphics: Principles and Practice", Oct. 1996, pp. 721-745.

Foley et al., "Computer Graphics: Principles and Practice", Second Edition in C, pp. 731.

Gauvain, J. L. et al., "Spoken LanguageComponent of the MASK Kiosk", Human Comfort and Security of Information Systems, 1995.

Gauvain, J.L. et al, "The LIMSI Continuous Speech Dictation System", Proc. ARPA Human Language & Technology, 1994.

Gauvain, J.L. et al, "The LIMSI Continuous Speech Dictation System: Evaluation on the ARPA Wall Street Journal Task", Proc. Of the IEEE-ICASSP, 1994.

Glorianna Davenport, Thomas Aguirre Smith, Natalio Pincever, "Cinematic Primitives for Multimedia," Aug. 1991, IEEE Computer Graphics and Applications, vol. 11, No. 4, pp. 67-74.

Goddeau, D. et al., "Galaxy: A Human-Language Interface to On-Line Travel Information", Proc. Of ICSLP, 1994.

Gran Turismo 3 ("GT3"), Sony Computer Entertainment, Released Apr. 28, 2001, User manual, pp. 7.

Gueziec, A. et al., "Simplicial Maps for Progressive Transmission of Polygonal Surfaces", Proceedings, VRML 98 Third Symposium on the Virtual Reality Modeling Language ACM, 1998, pp. 25-31, 131, New York, NY, USA.

Hayano, Masayuki, et al., "Mesh Simplification Using Edge Operation with Feature Detection", Inf. Proc. Soc. Of Japan SIG Technical Report, Feb. 27, 1998, vol. 98, No. 16.

House, D., "Spoken-Language Access to Multimedia (SLAM): Masters Thesis", Oregon Graduate Inst., Dept. of CS and Eng., 1995.

Internet.Com, "Graphical User Interface", available at http://www.webopedia.com; accessed Sep. 24, 2004. Last Modified May 17, 2004.

Konma, Toshihiro, "Rendering and Texture: Introduction to CG Creation in the Multimedia Age", Nikkei Bus. Pub., Inc. Nov. 1996, pp. 237 (Bump Mapping).

Lamel, L.F. et al., "Recent Developments in spoken Language systems for Information Retrieval", ESCA ETRW Spoken Dialog Systems, 1995.

Language Industry Monitor, "Janet Baker's Optimism", 1992.

Matsushita, Yasuyuki, "Special Effects: Interobject Reflection effect: Starting OpenGL Programming with Mesa 3D", Itsutsubachi Res. Co., Ltd., Jan. 2000, pp. 148-153.

Mostow, Jack, et al., "Towards a Reading Coach That Listens: Automated Detection of Oral Reading Errors", Proc. Of the 11th Ntl. Conf. on A.I., 1993.

Nakamura, Hiroko, et al., "Adaptive Transmission of Polygonal Patch Datasets . . . ", Inf. Proc. Soc. Of Japan SIG Technical Report, Sep. 8, 2000, vol. 2000, No. 8.

Nayer, Shree K., et al., Lighting Sensitive Display, ACM Transactions on Graphics, Oct. 2004, vol. 23, No. 4, pp. 963-979, New York.

Palmer, Chriss et al., "Tile Based Games FAQ," GMEDEV, Aug. 31, 2000.

Peercy, et al., "Interactive Multi-Pass Programmable Shading," Computer Graphics Proceedings, SIGGRAPH 2000, Jul. 2000.

Phong, Bui Tuong, "Illumination for Computer Generated Pictures," Communication of the ACM, 18(6), pp. 311-317, Jun. 1975.

Pratt, David R., "A Software Architecture for the Construction and Management of Real-Time Virtual Worlds", Jun. 1993, pp. 62-67.

Project Gotham Racing release information, Aug. 2, 2006, Gamespot.com, http://www.gamespot.com/xbox/driving/projectgothamracing/similar.html?mode=versions.

Project Gotham Racing Screenshot, Avault, Nov. 14, 2001, http://www.avault.com/consoles/reviews/xbox/avscreenshot.asp?pic=pgr&num=5.

Proudfood, et al., "A Real-Time Procedural Shading System for Programmable Graphics Hardware," Computer Graphics Proceedings, SIGGRAPH 2001, Aug. 2001.

Road Blasters Path Markers, MobyGames, Jan. 25, 2007, http://www.mobygames.com/game/nes/readblasters/screenshots/gameShotld,35174/.

Road Blasters Release Information, GameSpot, Jan. 25, 2007, http://www.gamespot.com/nes/driving/roadblasters/index.html?q=roadblasters.

Rushmeier, et al., "Extending Radiosity Method Include Specularly Reflecting and Translucent Materialsm" ACM Transaction on Graphics, vol. 9, No. 1, Jan. 1990.

Russell, M. et al., "applications of Automatic Speech Recognition to Speech and Language development in Young Children", Proc of ICSLP, 1996.

Schlick, C., "A Survey of Shading and Reflectance Models," Computer Graphics Forum, Jun. 1994, pp. 121-132, vol. 13, No. 2.

Schlicke, C., "A Fast Alternative to Phong's Specular Model," Graphics Gems IV, pp. 385-386, 1994.

Screen Shot of a Civilization Building Game; Available at http://www.s2.com.br/s2arquivos/361/Imagens/2323 Image, jpg (accessed Oct. 11, 2005).

Screen Shot of a Civilization Building Game; Available at http://www.s2.com.br/s2arquivos/361/Imagens/2324 Image, jpg (accessed Oct. 11, 2005).

Screen Shot of a Flight Simulator, Available at http://foto.spullenbank.nl/common/img/00/00/03/31/.sub.—T33178.jpg.

Screen Shot of a Flight Simulator; Avalable at http://orbitmedphys.ucl.ac.uk/images/gallery64.jpg (accessed Oct. 11, 2005).

Screen Shot of a Role Playing Game; Available at http://images.fok.nl/upload/lotrrotk2.jpg (accessed Oct. 11, 2005).

Screen Shot of a Role Playing Game; Available at http://images.fok.nl/upload/lotrrotk3.jpg (accessed Oct. 11, 2005).

Segen et al., "Gesture VR: Vision-Based 3D Hand Interface for Spatial Interaction," Proceedings of Sixth ACM International Conference on Multimedia, 1998.

Sergen, et al., "Gesture VR: Vision-Based 3D Hand Interface for Spatial Interaction," p. 455-464.

Spagnoletti, Simon, Phillips Ambilight TV, Home Entertainment, engadget, Jul. 8, 2004.

Tang et al., "Blending Structured Graphics and Layout", Symposium on User Interface Software and Technology, Proceedings of the 7th Annual ACM Symposium on User Interface Software and Technology, Marina del Rey California, United States, pp. 167-173 (1994).

Taylor, Philip, "The MSDN Shader Workshop Application, Part 1," Microsoft Corporation, Mar. 25, 2002.

Thalmann, et al., "Interactive Computer Animation", 1996, Prentice Hall Europe, pp. 182-186.

Voorhoies, D., et al. "Reflection Vector Shading Hardware", Computer Graphics Proceedings, annual conference Series 1994, Siggraph 94 conference Proceedings, ACM, 1994, pp. 163-166, New York, NY, USA.

Ware et al., "Reaching for Objects in VR: Displays:Lag and Frame Rate," ACM Transactions on Computer-Human Interaction, vol. 1, No. 4, Dec. 1994.

* cited by examiner

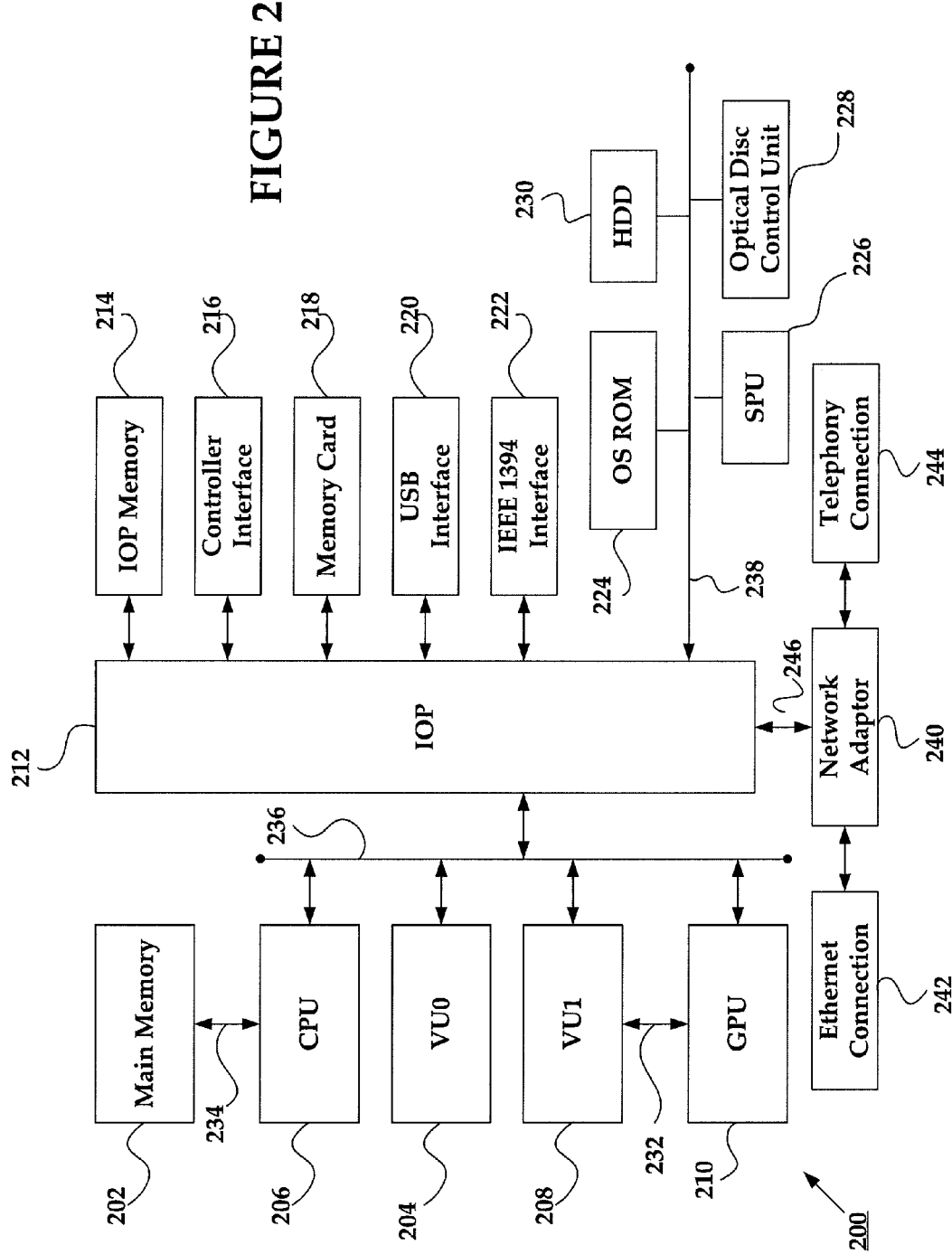

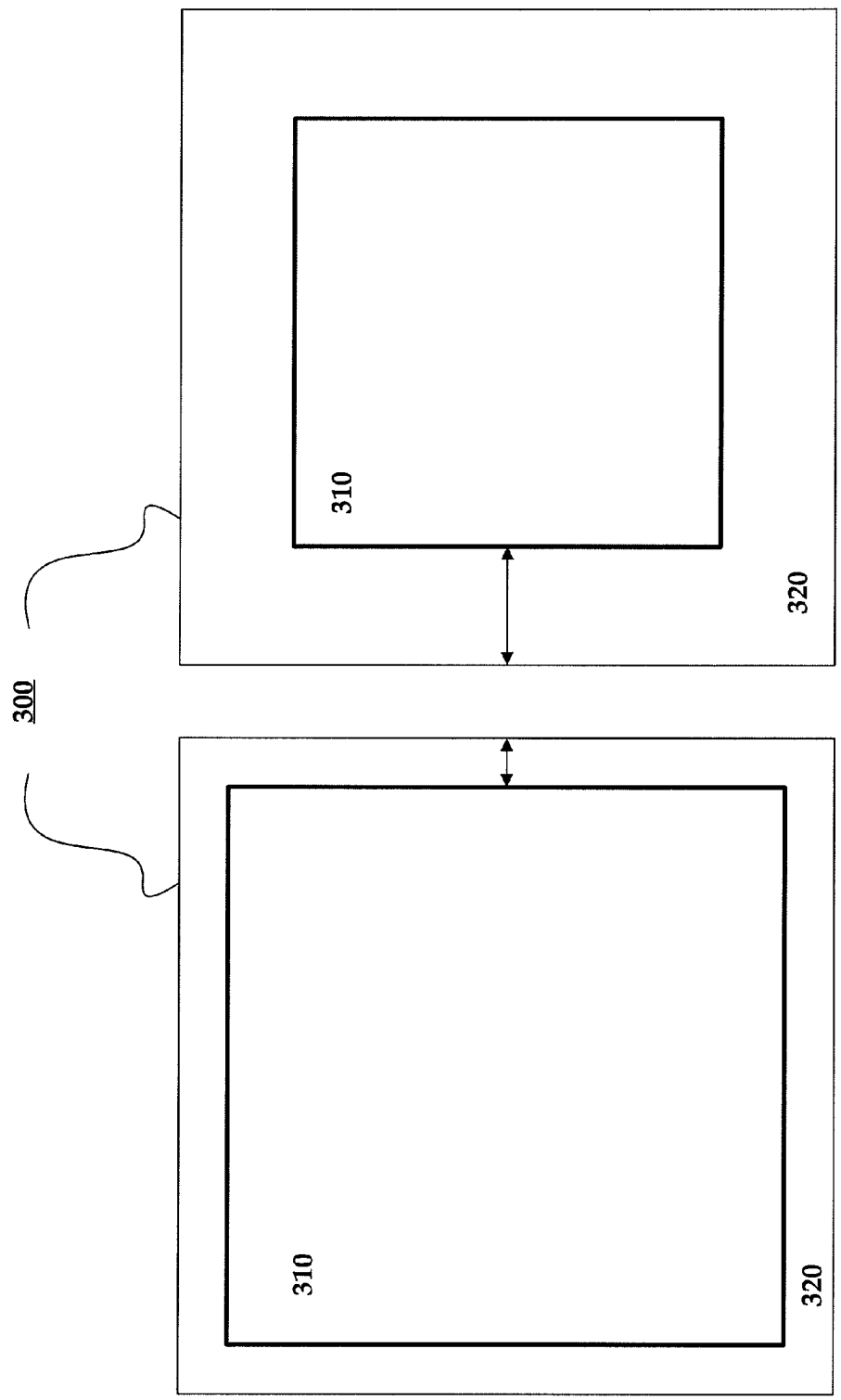

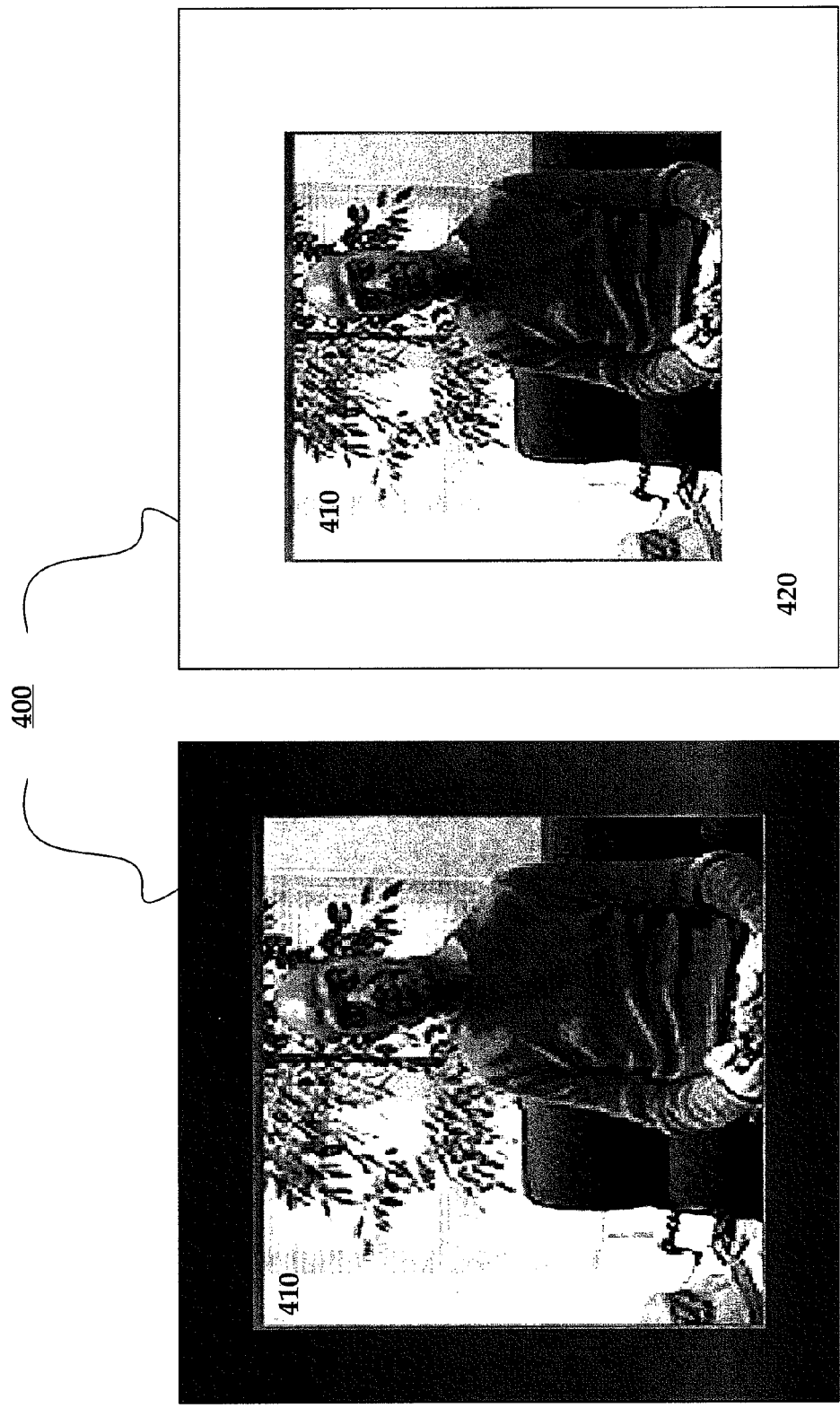

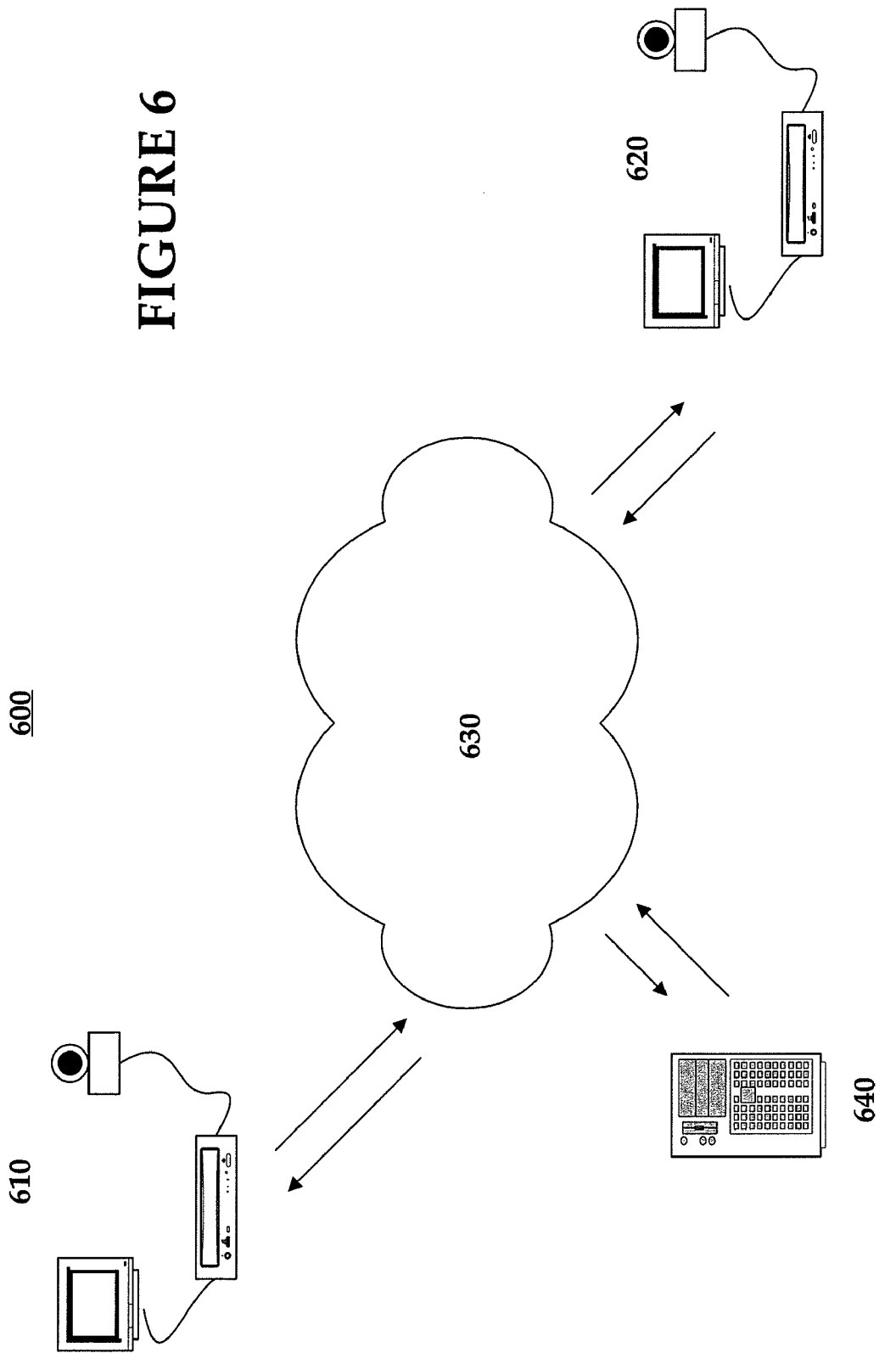

IMPLEMENTING LIGHTING CONTROL OF A USER ENVIRONMENT

CROSS-REFERENCE TO RELATED APPLICATIONS

The present application is a continuation and claims the priority benefit of U.S. patent application Ser. No. 11/744,816 filed May 4, 2007 now U.S. Pat. No. 7,880,746 and entitled "Bandwidth Management Through Lighting Control of User Environment Via a Display Device," which is a continuation-in-part and claims the priority benefit of U.S. patent application Ser. No. 11/624,886 filed Jan. 19, 2007 and entitled "Lighting Control of a User Environment via a Display Device," which claims the priority benefit of U.S. provisional patent application No. 60/798,112 filed May 4, 2006 and entitled "Lighting Control of a User Environment via a Display Device." The disclosure of each of the aforementioned applications is incorporated herein by reference.

BACKGROUND OF THE INVENTION

1. Field of the Invention

The present invention generally relates to the generation of visual data through an image capture device during an audio/visual session such as an 'audio/visual chat' session or during video game play. More specifically, the present invention relates to control of lighting conditions in a user environment whereby the bandwidth consumed by transmission of image data generated and/or captured during such audio/visual sessions may be effectively managed.

2. Description of the Related Art

With the increased processing capabilities of various computing systems, new methods for interacting with those computer systems have become available. For example, a variety of input devices employing video image capture allow user control of or interaction with objects on a graphical display such as a video monitor.

Such video input devices often are responsive to the movement or position of a user in the field of view of an image capture device. Video image processing translates the movement of the user that has been captured as a sequence of video images into signals that may be used, for example, to control a character or avatar in a video game. Alternatively, image processing may generate a video image to be displayed in a 'chat' session in a manner similar to a video conference.

An image capture device typically scans a field of view in which a user may be present (e.g., a user environment such as an office, game room, living room or the like). The captured video image may be applied to a video digitizer that provides digital output to a processor that analyzes and processes the digital information received from the digitizer. Based upon the position or movement of the participant in the field of view, the processor produces signals that are used by the graphics generating system to move objects on the display. Similarly, the system may generate an image of the user for transmission to another user in a chat session.

The output of the devices on graphical displays can be significantly affected by a variety of factors, especially lighting conditions in the user environment. The computer processing time required for image processing in an ideal user environment may be extensive and complex and tends to require substantial computing and/or temporal resources. A user environment that is overexposed or underexposed as to particular light sources only complicates such processing activities in that the system must compensate for the adverse lighting conditions thereby resulting in slower computing operations and affecting any real-time interactions. In some instances, the lighting conditions are so adverse that a computing system cannot compensate for the particular environment conditions and inaccurate data—if any—is generated thereby resulting in incorrect game control or the generation of poor chat session video.

Similarly, lighting conditions may contribute to the amount of bandwidth consumed by transmission of a captured video image (or images). This may be especially true in the context of real-time, full-motion video as may be generated in the context of a video chat session. Video signals, by their very nature, consume large amounts of bandwidth notwithstanding the application of a variety of compression techniques (e.g., lossy compression) as are known in the art. An overwhelming presence of a certain color or colors in a particular environment (e.g., as might be generated by bright lights of a particular color) may be captured by an image capture device. Transmission of that image and its excessive color saturation may increase an overall file size and lend to excessive bandwidth consumption. Excessive bandwidth consumption may, in turn, contribute to a degraded conferencing experience (e.g., jitter).

There is a need for an image capture device whereby the lighting conditions of various user environments can be automatically and dynamically controlled subject to the particular requirements of the capture device or hardware and software related thereto. Additionally, there is a need for lessening the computational burdens of an image processing system coupled to such a device whereby the system may function substantially in real-time thus providing the user with a natural interaction experience with regard to a game, chat session, or any other interaction involving the aforementioned image capture device. Further still, there is a need in the art to reduce bandwidth consumption that may occur as a result of the capture of certain image data that increases overall transmission file size.

SUMMARY OF THE INVENTION

In an embodiment, a system for managing bandwidth consumption through control of lighting conditions in a user environment is disclosed. An image capture device captures image data in a user environment, which is then transmitted over a communications network. A computing device may be coupled to the communications network to measure consumption of bandwidth related to transmission of the captured image data over the communications network. A display device may display an inner frame area and an outer frame. The inner frame area and the outer frame area control at least one lighting condition in the user environment in response to the consumption of bandwidth as measured by the computing device.

In another embodiment of the present invention, a method for managing bandwidth consumption through control of lighting conditions in a user environment is disclosed. Image data is captured and transmitted over a communications network. Consumption of bandwidth related to transmission of the captured image data over the communications network is measured. An inner frame area and an outer frame area may be generated on a display device in the user environment. At least one lighting condition in the user environment may be controlled via the inner frame area and the outer frame area in response to the consumption of bandwidth as measured by the computing device.

A video conference system includes a first image capture device and a second image capture device. Each device is configured to capture user environment image data in a respective user environment and for transmission over a communications network. A conference management server receives the first user environment image data and the second user environment image data and measures consumption of bandwidth related to transmission of the first user environment image data and the second user environment image data over the communications network. A first user client computing device and a second user client computing device are each associated with a respective image capture device. The first and second user client computing devices receive lighting control instructions from the conference management server in response to the consumption of bandwidth as measured by the conference management server. The lighting control instructions received from the conference management server include generating an outer frame area and an inner frame area on a display device at both the first user client computing device and second user client computing device, the outer frame area and inner frame area collectively controlling at least one lighting condition in the respective user environment.

BRIEF DESCRIPTION OF THE DRAWINGS

FIG. 2 illustrates a block diagram of one embodiment of a client computing device for generating real-time, three-dimensional, interactive environment data.

FIGS. 3A and 3B illustrate an exemplary video display device comprising an inner frame area and an outer frame area for implementing lighting control of a user environment in accordance with one embodiment of the present invention.

FIGS. 4A and 4B illustrate an exemplary video display device reflecting different degrees of illumination intensity in the outer frame in accordance with one embodiment of the present invention.

FIG. 6 illustrates an exemplary network of real-time, three-dimensional, interactive environment data generating systems as may be utilized in a 'chat' session or interactive video game in accordance with one embodiment of the present invention.

DETAILED DESCRIPTION

Figure 1:
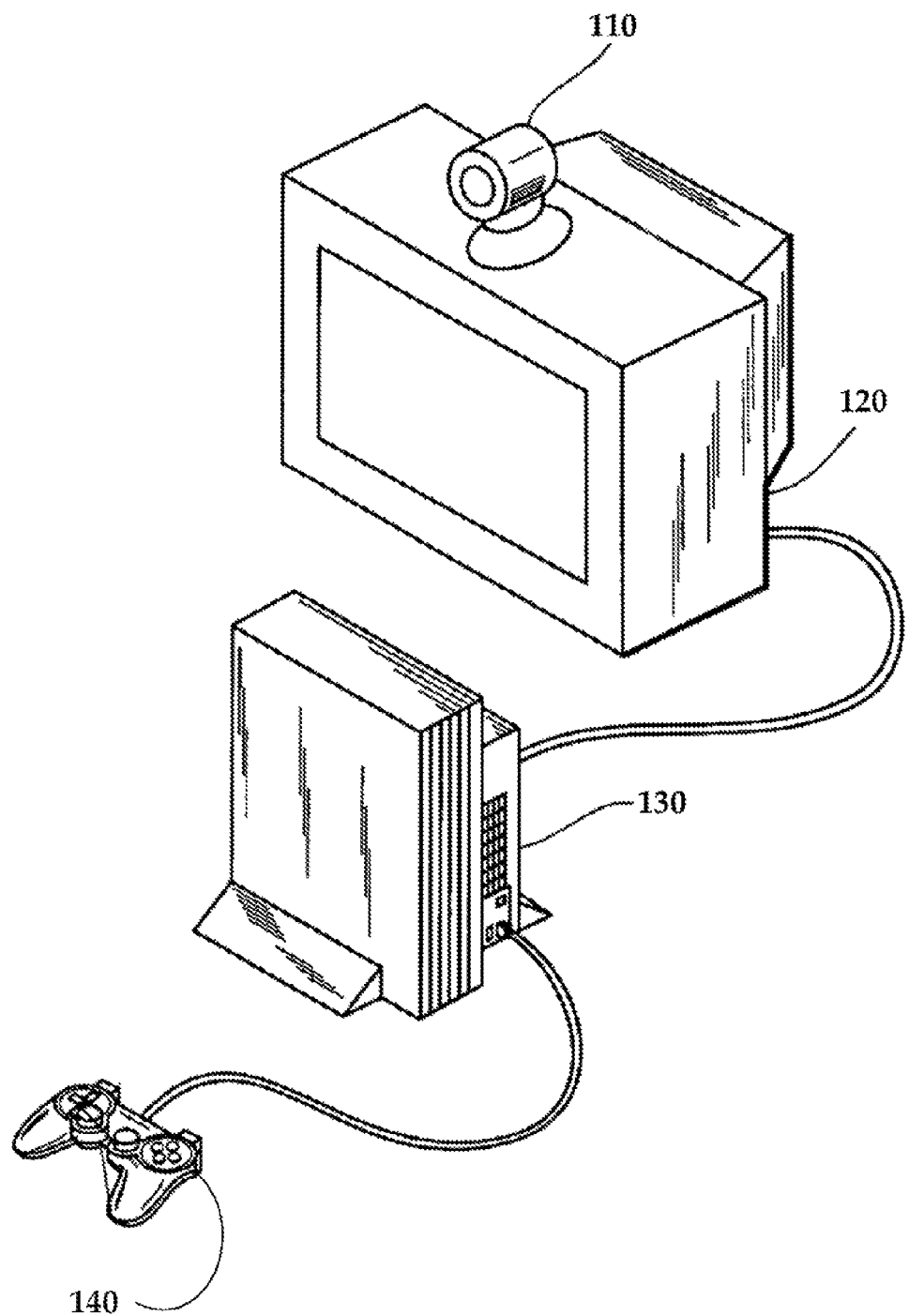
FIG. 1 illustrates an exemplary system for generating real-time, three-dimensional, interactive environment data according to an embodiment of the present invention.

FIG. 1 illustrates an exemplary system 100 for generating real-time, three-dimensional, interactive environment data according to an embodiment of the present invention. The system 100 comprises an image capture device 110, a video display device 120, and a client computing device 130 having processor functionality such as a home entertainment system for video games. The client computing device 130 may be further coupled to a controller device 140 as is shown in FIG. 1. Generally, a user and a related environment, such as a living room, are located within the field-of-view of the image capture device 110.

The client computing device 130 may be implemented as a PlayStation® 3 from Sony Computer Entertainment Inc. It should be noted, however, that the client computing device 130 and its processor functionality may be implemented in other types of computing devices such as personal computers, workstations, laptop computers, wireless computing devices, portable media devices, or any other type of computing device that may be capable of receiving and processing graphical image data.

Video display device 120 may be any device configured for the display of video data such as a television or computer monitor. In one embodiment, video display device 120 receives graphical image data from client computing device 130 via an AV MULTI OUT connector that may be coupled to an integrated audio/video cable and the requisite video and audio connectors. Various other connection mechanisms may also be used, for example, S VIDEO, an RFU adaptor, component video input (Y $C_B$/$P_B$ $C_R$/$P_R$), and HDTV input (Y $P_B$ $P_R$) as well as the High Definition Multimedia Interface (HDMI) and Digital Visual Interface (DVI). In some embodiments, such as a portable media device, the client computing device 130 and video display device 120 may be integrated as is the case in a PlayStation® Portable from Sony Computer Entertainment Inc.

Image capture device 110 may be, in one embodiment of the present invention, a color digital camera device with functionality similar to that of a webcam. Image capture device 110 may be coupled to client computing device 130 via a USB cable. In some embodiments, image capture device 110 may utilize a wireless transmission protocol to exchange data with the client computing device 130 (e.g., 802.11x). Image capture device may also include commercially available dedicated video conferencing products such as those manufactured by Polycom, Inc. of Pleasanton, Calif.

Image capture device 110 extracts specific information from captured multi-dimensional image data for subsequent presentation to a user of the device (e.g., a color image on video display device 120 or for transmission to another user over a network as in FIG. 6 below). For example, captured image data may be integrated into a video game or other user-centric application (e.g., a workout or training video). Captured image data may also be utilized in a video conference or 'audio/visual chat session' wherein the captured data may be transmitted to another user's computing device for display.

Image capture device 110 may be capable of capturing and mapping in three dimensions in addition to normal two-dimensional video imagery. Similar to normal cameras, image capture device 110 captures two-dimensional data for a plurality of pixels that comprise the video image. These values are color values for each pixel—generally red, green, and blue (RGB) values. In this manner, objects captured by the image capture device 110 appear as two-dimensional objects on a monitor.

Unlike a conventional camera, however, image capture device 110 may also capture depth values in a particular field-of-view (e.g., a particular user environment). That is, image capture device 110 may capture the x and y components of an environment using RGB values for each pixel in the environment in addition to a z-component, which represents a depth value for the environment. (i.e., the z-axis).

In operation, a z-value may be captured for each pixel of the scene, each z-value representing a distance from the camera to a particular object in the scene corresponding to the related pixel. A maximum detection range may be defined beyond which depth values will not be detected. Through the use of z-value capture, each object can be tracked in three-dimensions whereby the z-values along with the two-dimensional pixel data can be processed to create an enhanced three-dimensional interactive environment for the user.

An input image processor (not shown) at client computing device 130 translates the captured video images and depth data into signals that are delivered to an output image processor (not shown) at the client computing device 130. The output image processor may be programmed to effect movement and status of virtual objects on the video display device 120 in response to signals received from the input image processor. In some embodiments, input and output image processors may be an integrated part of the hardware and software configuration of the image capture device 110. In other embodiments, such processing functionality may be partially distributed over a network like that shown in FIG. 6, such processing taking place at, for example, a conferencing management server. Some embodiments of the image capture device 110 may also be configured for the capture and subsequent processing of visual data in high-definition.

Various image processing techniques allow a user to interact with the image capture device 110 using motion, color detection and, in some embodiments, sound through a built-in microphone or other audio input device (not shown) coupled to the image capture device 110 or client computing device 130. Certain interaction techniques are disclosed in U.S. patent publication number US 2004-0207597 A1 for a "Method and Apparatus for Light Input Device" and U.S. Pat. No. 7,102,615 for a "Man-Machine Interface Using a Deformable Device." A prop-input device is disclosed in U.S. patent publication number US 2004-0239670 A1 for a "System and Method for Providing a Real-Time Three-Dimensional Interactive Environment" as well as U.S. Pat. No. 6,795,068 for a "Method for Mapping an Object from a Two-Dimensional Camera Image to a Three-Dimensional Space for Controlling Action in a Game Program." The disclosures of all of the aforementioned applications and patents are incorporated herein by reference.

As disclosed in incorporated U.S. Pat. No. 6,795,068, a user may hold a prop object in front of a digital video camera, for causing an action to occur in a video game. The prop may comprise a stick-like object, which is made up of a handle. The user may stand in front of a video camera, which may comprise a USB webcam or a digital camcorder connected to an input/output port of a game console. As the user moves the object in front of the camera, the features of the object are picked up by the camera, and processing is performed in order to isolate and discriminate a pixel group.

A three-dimensional description of the object, including its position and orientation in three-dimensional space, is calculated, and this description is correspondingly stored in the main memory of the game console. Then, using rendering techniques known in the art, the three-dimensional description of the object is used to cause action in a game program which is displayed on the display screen of the monitor.

For example, a virtual object can be moved throughout the scene of the game, corresponding to the movements of the real object made by the user. As the user changes the position and orientation of the object by moving it, the three-dimensional description of the object in the memory, and a corresponding rendering of the object in the rendering area of image memory, are continuously updated so that the position and orientation of the virtual object, or torch, on the monitor changes as well.

As disclosed in incorporated U.S. patent publication number US 2004-0239670, video image processing has been used to translate the movement of the user that has been captured as a sequence of video images into signals for game control. Based upon the position or movement of the participant in the field of view, a processor produces signals that are used by a graphics generating system to move objects on the display.

In one embodiment of the present invention, the image capture device 110 may be compact in design allowing for placement on top of a video console or television. Image capture device 110 may comprise a pivot thereby allowing for positioning of the device and its related field-of-view. The image capture device 110 may further comprise a rotational ring around the camera lens for manual focus control. Some embodiments of the image capture device 110 may provide for automated positioning and focusing through the use of a directional-sensitive microphone that tracks a source of audio (e.g., an individual who is speaking) and the focus of the image capture device 110 may be subsequently adjusted according to the position of the audio source relative to the image capture device 110.

Referring now to FIG. 2, a block diagram of one embodiment of a client computing device or client 200 (130) is illustrated. Client computing device 200 may be used to aid in the generation of real-time, three-dimensional, interactive environment data. The client 200 may be communicatively coupled to image capture device 110 in order to generate the aforementioned environment data.

The client 200 may comprise, but is not limited to, a main memory 202, a central processing unit (CPU) 206, vector processing units VU0 204 and VU1 208, a graphics processing unit (GPU) 210, all of which may be coupled via a bus 236 to an input/output processor (IOP) 212. The client 200 may also comprise an IOP memory 214, a controller interface 216, a memory card 218, a Universal Serial Bus (USB) interface 220, and an IEEE 1394 interface 222. The client 200 may further include an operating system read-only memory (OS ROM) 224, a sound processing unit (SPU) 226, an optical disc control unit 228, and a hard disc drive (HDD) 230, all of which may be connected via a bus 238 to IOP 212.

Some embodiments of the client 200 may also include a network adaptor 240, which may offer an Ethernet connection 242 and/or telephony connection 244. The client 200, in one embodiment, may be an electronic gaming console although client 200 (or portions thereof) may also be implemented as a general-purpose computer, a set-top box, a hand-held gaming device, or in a mobile device such as a cellular phone. It should further be noted that various other system architectures may be utilized within the scope of the present invention such as the computer architecture and high speed processing model disclosed in U.S. patent publication number 2002-0138637 for a "Computer Architecture and Software Cells for Broadband Networks," the disclosure of which is incorporated herein by reference.

The CPU 206, the VU0 204, the VU1 208, the GPU 210, and the IOP 212 communicate via a system bus 236. The CPU 206 communicates with the main memory 202 via a dedicated bus 234. The VU1 208 and the GPU 210 may also communicate with one another via a dedicated bus 232. The CPU 206 executes programs stored in the OS ROM 224 and the main memory 202. The main memory 202 may contain pre-stored programs and may also contain programs transferred via the IOP 212 from a CD-ROM, DVD-ROM, or other optical disc (not shown) using the optical disc control unit 228. The IOP 212 controls data exchanges between the CPU 206, the VU0 204, the VU1 208, the GPU 210 and other devices of the client computing device 200, such as the controller interface 216, or from other such systems via the network adaptor 240.

The GPU 210 executes drawing instructions from the CPU 206 and the VU0 204 to produce images for display on a display device (not shown). The VU1 208 transforms objects from three-dimensional coordinates to two-dimensional coordinates, and sends the two-dimensional coordinates to the GPU 210. The SPU 226 executes instructions and processes data to produce sound signals that are output on an audio device (not shown).

A user of the client 200 provides instructions to the CPU 206 via a controller coupled to the controller interface 216. Controller may be any control device, for example, a joystick, a set of directional buttons, and/or other control buttons. An exemplary controller is illustrated in FIG. 1 (140). A user may instruct the CPU 206 to store certain information on the memory card 218, which may be removable (e.g., a flash memory or other non-volatile memory card), or may instruct a character in a game to perform some specified action. Other devices may be connected to the client computing device 200 via the USB interface 220 and the IEEE 1394 interface 222. As previously noted, the image capture device 110 may be coupled to the client 200 utilizing a USB connector or, in another example, a wireless Ethernet network through Ethernet connection 242.

In that regard, some embodiments of the client 200 comprise a network adaptor 240 that provides the hardware functionality necessary for the client 200 to connect to a network. The network adaptor 240 may comprise, for example, a system connector that operates to connect the network adaptor 240 to the client computing device 200 through an expansion bus connector 246. The network adaptor 240 may also comprise a power connector and data connector to allow for the provisioning of power from the client 200 to the network adaptor 240 and the exchange of data between the client 200 and the network adaptor 240. Network adaptor 240 may be fully integrated with the client 200 or may be a detachable hardware device that may be implemented in older legacy client computing devices 200.

In some embodiments of the present invention, the network adaptor 240 may also require the installation of certain software on the client 200 to allow for identification and connection to a particular IP address and/or dial-up to a particular Internet Service Provider. Software may also provide other functionalities, such as the creation and maintenance of user profiles, in addition to functional interaction between the client 200 and the network adaptor 240. Such software or data related to such functionality may be embodied on CD-ROMs for games or applications requiring a network connection; stored on memory card 218; or part of a firmware upgrade.

The network adaptor 240 may also comprise an Ethernet connection 242. Through the Ethernet connection 242, a network cable (e.g., a 100 Base-TX or 10-Base T) may be coupled to the network adaptor 240 for connection to a network. The network cable may, for example, be communicatively coupled to a DSL or cable modem. The network cable may also be communicatively coupled to, for example, a router via a LAN port; the router may then be coupled to a DSL or cable modem through a WAN port. In further embodiments, the Ethernet connection 242 may allow for a network cable to be connected to a wireless Ethernet bridge. The wireless Ethernet bridge may be communicatively coupled to a wireless router utilizing, for example, an 802.11x protocol. The wireless router may be further communicatively coupled to a cable or DSL modem.

The network adaptor 240 may also comprise a telephony connection 244. Through the telephony connection 244, a standard telephone line with, for example, an RJ-11C telephone connector may be connected to the network adaptor 240 and a telephone wall jack. In this regard, the network adaptor 240 may further comprise modem functionality such that the client computing device 200 may communicate data over the public switched telephone network via the telephony connection 244.

FIG. 3A illustrates an exemplary video display device 300 comprising an inner frame area 310 and an outer frame area 320 for implementing lighting control of a user environment in accordance with one embodiment of the present invention. Lighting control of the user environment may also be used in the context of bandwidth management as further discussed herein. Video display device 300 corresponds to the video display device 120 originally referenced in FIG. 1 and coupled to client computing device 130 (client 200 of FIG. 2) for the display of images or other drawing instructions by GPU 210. Video display device 300 may also comprise audio output functionality (e.g., a built-in speaker system) to emit audio signals produced by SPU 226.

Inner frame area 310 and outer frame area 320 are artificial boundaries that may be created by client computing device 130 as the result of drawing instructions from the CPU 206 being executed by GPU 210. The dimensions of these areas may be determined by or in light of a particular software title being executed (e.g., a video game title utilizing an image capture device 110) or by a server component as might be utilized in an audio/visual 'chat' session as is discussed in further detail in FIG. 6. In some embodiments—for example, in the case of a 4:3 game shown on a 16:9 display—the outer frame area 320 may be the extra 'dead space' on the sides of a widescreen display.

Referring to FIG. 3B, the size of outer frame area 320 is larger than that of the corresponding outer frame area 320 in FIG. 3A. Accordingly, the inner frame area 310 of FIG. 3B is smaller than that of the corresponding inner frame area 310 in FIG. 3A. The inner frame area 310 and outer frame area 320 may also be subject to particular user configurations or settings that may be saved on memory card 218 or some other memory device coupled to the client computing device 130. Inner frame area 310 and outer frame area 320 may be adjusted in response to certain determinations made by client computing device 130 or in response to certain instructions received from another computing device over a network.

In one embodiment of the present invention, video game data will be displayed in the inner frame area 310. This could include image data of the user as might be generated by the image capture device 110 or a derived visual game state based upon the image data of the user. For example, the image capture device 110 may capture an image of the user for insertion into a game environment in the form of an avatar. Similarly, the image capture device 110 may generate data used to determine whether the user came into contact with a particular portion of the game environment by 'grabbing' at an object or providing input data through a prop device. This real-world activity or interaction may be reflected in the game environment as a result of the user, for example, swinging at a baseball with a baseball bat prop device in an interactive baseball game. An image capture device 110 tracks and captures the swinging of the baseball bat prop device and, through the necessary image processors, translates that real-world activity into on-screen display data.

The inner frame area 310 may also be used to display 'chat' session data such as the image of a remote participant communicating with the user. The inner frame area 310 may also display multi-media data generated by the remote participant and transmitted to the present user in the form of a textual 'instant message' or a short video clip. Various types of interactive data may also be displayed in the inner frame area 310 such as an interactive game (e.g., chess or checkers) or a collaborative document (e.g., a report that is being concurrently edited by one or more parties).

As has been previously noted, image capture device 110 may require certain light levels or light conditions in order for the image capture device 110 to function properly or optimally. If the environment in which the image capture device 110 is operating in lacks sufficient light, certain data (e.g., user interactions or prop input data) may not be detected because the image capture device 110 cannot properly discern various x-y-z position values, color differentiations, or otherwise detect motion of a user or object. Image capture device 110, in conjunction with software and/or hardware operating internally to the image capture device 110, at the client computing device 130, and/or by an intermediate server as is discussed in FIG. 6, will determine whether there is proper light present in the environment to properly capture data (e.g., with respect to a target histogram). Similar determinations may be made with regard to, for example, the presence of too much light if the image capture device 110 or a client computing device (130) coupled to the image capture device 110 is configured with an infrared (IR) receiver to receive commands from a remote control (e.g., camera on/camera off). Various other spectral emissions may be subject to such user environment light control.

In the context of managing bandwidth consumption as discussed further herein, determinations may be made with respect to the presence of too much light or over-saturation with respect to a particular color. These excesses may result in spikes in bandwidth consumption when transmitting image or video data captured and/or generated by image capture device 110. Spikes in bandwidth consumption may result in a less than optimal conferencing experience, especially in constricted bandwidth environments.

Image capture device 110 in conjunction with the aforementioned software and/or hardware operating internal to the image capture device 110, at the client computing device 130, and/or by an intermediate server as discussed in FIG. 6 may determine, for example, that too much red light is present in the environment. This light may come from an external source such as natural sunlight through a window proximate the user environment, from an artificial lighting source in the user environment (e.g., an overhead lamp), or from the display device 300 itself. Utilizing the various display and frame adjustment techniques discussed herein, certain colors may be 'muted,' 'countered' or otherwise 'cancelled' through additive (e.g., mixing of red, green, and blue) and subtractive (e.g., subtracting a hue out of a color scheme by adding more of another) color techniques as are known in color theory.

In the event that there is a determination that insufficient light exists to properly capture image data or that too much light or a particular hue of light exists and is adversely affecting bandwidth consumption, the outer frame area 320 may be used to provide additional light to the user environment such that the video display device 300 operates as an artificial light source (e.g., certain RGB values of individual pixels in the display display 300 are adjusted as to average a necessary user environment light level). That is, the outer frame area 320 will become visibly brightened with a particular color and/or intensity of light such that the video display device 300 lights the environment proximate to the image capture device 110 whereby image data may be properly captured for subsequent processing.

For example, a user may be utilizing the image capture device 110 to play the aforementioned simulated baseball game with a prop device. As such, the user may find an avatar of themselves inserted into the 'home plate' video game environment and displayed in the inner frame area 310 of FIG. 3A. If the image capture device 110 and related processing utilities determine that there is insufficient light in the scene environment to properly track the prop device or any other aspect of the user, the video game software operating at client computing device 130 may (via CPU 206) cause the execution of rendering instructions by the GPU 210 that causes the rendering on the display device 300 of a white 'filler' in the outer frame area 320 (i.e., the execution of drawing instructions that causes the individual pixels within the outer frame area 320 to display a particular luminance and/or shading). The inner frame area 310 would continue to display the baseball video game and related information while simultaneously becoming surrounded by a white 'halo' in the outer frame area 320.

This white 'halo' displayed by the video display device 300 will 'spill' into the real-world environment of the user—that is, the light emitted by the display and measured in candelas per meter squared ($cd/m^2$)—whereby the video display device 300 actually becomes an alternative light source. This additional light generated by the video display device 300 will result in the generation of sufficient additional light to allow for the image capture device 110 to properly capture image data for processing. The intensity of the 'halo' emitted by the outer frame area 320 can be controlled in part by the particular rendering instructions from GPU 210; that is, how white (what shade of white) and how bright (the intensity thereof).

Similarly, if a particular environment exhibits too much of a particular hue of light such that it is degrading transmission of image data (i.e., consuming excess bandwidth), the color and/or intensity of the 'halo' of the outer frame area 320 (and/or the inner frame area 310) may be adjusted and manipulated to compensate for the same. In the context of the Munsell color system, excess saturation (also referred to as chroma) of one particular hue (red) may be countered by a hue of the opposite color (blue/green). The particular saturation/hue combination may be wholly opposite, slightly opposite, or substantially opposite the excess saturation depending on particular network conditions.

In some embodiments of the present invention, the particular hardware configuration of the display device 300 may be taken into account such that the GPU 210 may optimize the resources at its disposal with regard to manipulating the outer frame area 320 and the light emitted by the same. These configurations may be automatically detected by the client computing device 200 or provided to the client computing device 200 through user input as to particular configurations, the brand and model of the display device 300 (which in turn corresponds to particular operating specifications), and so forth. In some embodiments, client computing device 200 may consult a look-up table or other data store (either locally or over a network) to identify particular operating capabilities (e.g., bit depth) for a particular display model if those capabilities are not immediately identified by the user or through certain plug-and-play (PnP) functionality.

For example, a liquid crystal display (LCD) in a flat screen television comprises a certain resolution (i.e., the number of dots of color—pixels—on the display) referenced by a horizontal axis (rows) and vertical axis (columns). A wide aspect 22-inch LCD monitor may conform to the WUXGA (Wide Ultra Extended Graphics Array) standard and comprise a resolution of 1920×1200 whereas a smaller device such as a 15-inch LCD monitor may only conform to the XGA (Extended Graphics Array) standard and comprise a resolution of 1024×768. While an LCD display device is referenced, the present invention is equally as applicable to a CRT-based display.

Additionally, the particular display mode of a video display device 300 determines how many colors that video display device 300 can display. For example, a display that is configured to operate in SuperVGA mode can display 16,777,216 colors (also known as true color) the result of a 24-bit-long description of a pixel (the bit depth). For example, in 24-bit bit depth, eight bits are dedicated to each of the three additive primary colors (RGB). The bit depth therefore determines the number of colors that can be displayed at one time. To create a single colored pixel an LCD, for example, uses three sub-pixels with red, green, and blue filers. Subject to the control and variation of the voltage applied, the intensity of each sub-pixel can range over 256 shades. Combining the sub-pixels produces a possible palette of 16.8 million colors (256 shades of red×256 shades of green×256 shades of blue).

The brightness of the light emitted into the user environment can also be affected by the size of the outer frame area 320 relative the inner frame area 310. Returning to FIG. 3A, by filling the outer frame area 320 with white image data, a certain degree of luminance may be created. Identical white image data (i.e., the same intensity and shade) in FIG. 3B, however, will create a greater degree of luminance in that the outer frame area 320 of FIG. 3B is larger than that of FIG. 3A. Thus, the amount of light that is generated by the video display device 300 though a 'halo' may be dynamically controlled during the use of image capture device 110.

For example, the image capture device 110 and related client computing device 130 may be in a room with a window in the late afternoon. While there may be sufficient natural light to support image data capture at the time game play commences, as the afternoon continues and the natural light source begins to disappear (i.e., the sun sets), there may be insufficient light for the image capture device 110 to properly continue to capture image data. The outer frame area 320 may, at that point, be illuminated as a white halo to provide the additional light necessary to allow for game play to continue. The intensity of the light, as noted, may be controlled by the client computing device 130 that may be running game software that has been calibrated with the image capture device 110 to determine when the proper amount of light is present to allow for the game to function as intended. In that regard, requisite light settings may be predetermined or calibrated based on the particular game and/or user environment.

As natural light continues to disappear throughout the course of the day, the intensity of the artificial light source emitted from the display device 300 may be gradually increased. For example, a dull gray light source in the outer frame area 320 may provide sufficient light at 4:00 PM but a flat white emission may be required from the outer frame area 320 at 6:00 PM. The intensity of the light may also be increased (e.g., the brightness of the light). At some point, the limitations of the video display device 300 may be such that even the most intense white available does not provide sufficient 'artificial light' to allow game play to continue. At that point, the GPU 210 may cause for the size of the inner frame area 310 to decrease and the outer frame area 320 to increase thereby providing additional artificial light (i.e., additional individual pixels in the screen display utilized for illumination purposes versus the display of game data). The dynamic adjustments described above and in the context of maintaining proper lighting conditions in a user environment are equally applicable in the context of bandwidth management.

In some instances, particular portions of the user environment may be subject to insufficient lighting conditions. For example, the right side of a room may have an open window whereby sufficient light may be provided to allow for image data capture. The left side of the room, however, may have window shades drawn such that no natural light may be entering that portion of the user environment. The orientation of the inner frame area 310 and outer frame area 320 may be adjusted such that the inner frame area 310 may be moved to the far right hand side of the video display device 300 whereby the inner frame area 310 may be off-center but providing a larger, focused outer frame area 320 on the left-side of the display such that additional artificial light may be generated by the video display device 300. The positioning and centering of the frame areas 310 and 320 may be dynamically adjusted as use of the image capture device 110 continues.

Alternatively, particular gradations of color from one-side of the display 300 to another may be implemented wherein the orientation of the inner frame area 310 and the outer frame area 320 may remain constant. In the aforementioned example where the left side of a room is darker than the right, the portion of the outer frame area 320 relative the left side of the room may emit a white light while the right side of the outer frame area 320 displays a neutral background color in that sufficient natural light is present on the right side of the room. A gradual gradation of color (from white to black) between the left side of the outer frame area 320 to the right side may bridge the two 'sides' of the outer frame area 320.

Particular portions of the outer frame area 320 (or other frame areas in the case of multiple frames surrounding the inner frame area 310) may be subdivided into various sub-sections. Each of those sub-sections may be subject to various lighting controls. For example, the outer frame area 320 may be sub-divided into four quadrants: an upper right, upper left, lower right, and lower left quadrant. Each of those individual quadrants may be subject to various lighting controls (e.g., the upper right and lower left corner of the frame may be illuminated while the upper left and lower right are not). These various controls include color, luminance, and any other condition that may be controlled by the various systems and methods disclosed herein.

The various sub-divisions may also be subjected to various shapes for both functional and aesthetic reasons. For example, instead of squares and rectangles, various triangle or other polygonal configurations may be implemented. Various circular or elliptical patterns may also be used. These and any other shape or design capable of being displayed (e.g., lines, squiggles, waves, dots, splotches, etc.) may be uniformly or randomly displayed as a group or with a variety of shapes and each object subject to lighting control. Various shapes and patterns may also be subject to strobing (i.e., regular, controllable series of high power flashes rather than continuous light) for a variety of effects.

For example, strobing may be used to create a strobe light feature in the user environment or, similarly, to counter an effect caused by natural or other artificial light conditions in the user environment. Certain video games or television programs that may cause epileptic fits, feelings of vertigo, and the like and that might be displayed in the inner frame area 310 may be countered through a counter-strobe effect in the outer frame area 320. In that regard, the presently described lighting controls systems and methods may also be implemented with traditional television programming in addition to 'chat' sessions and video games.

As noted, certain calibrations may take place through the image capture device 110. The image capture device 110 may, at start-up, sample the user environment to determine various lighting conditions and the effect those conditions will have on image capture over a particular operating range (e.g., lowest possible range of capture to an optimal range of capture). The image capture device, in conjunction with the various lighting controls discussed herein as implemented by various hardware and/or software operations, may then adjust certain user environment lighting conditions through inner frame area 310 and outer frame area 320 lighting manipulations (e.g., size, brightness, orientation, color). During the course of these adjustments, the image capture device 110 may 're-sample' the environment to determine what environmental control condition will allow for a particular operation of a game or chat session in light of the particular environment.

The client computing device 130 in conjunction with particular 'chat' or video game software may make that determination or such a determination may come as a result of a management server determination as is described in the context of FIG. 6. Similarly, the determination of a particular user environment condition may come from a user in another environment if that particular user is unable to properly view the first user in a chat session. That decision by a second user may be made by selecting an available environment setting in light of several environmental control conditions.

For example, during the start-up calibration, the first user environment may be subject to three different intensities of a particular color of light; three different colors of light; and three different frame area sizes. The image capture device 110 may capture an image of each of those nine possible environments. The effect of that particular environment control may then be displayed to the second user in the form of a still frame or even a short (e.g., 5 second) video clip. The second user may then select the particular environment control based on the image or clip that appears best. A user operating in a solo environment (e.g., playing a video game) may select a particular environmental control in a similar fashion.

These calibrations or adjustments may occur at start-up of a game or chat session or may occur dynamically during the session. For example, adjustments may occur automatically during game play or at breaks such as between levels. Adjustments may further occur in response to a user action wherein a query may be made such as during a pause. In some embodiments, a particular frame of data (e.g., an I-frame) may indicate the propriety and need to readjust lighting conditions in the user environment.

Similarly, particular frames of data may be recognized during the decoding process as likely to cause certain changes in the user environment. For example, incoming image data of a conference remote participant may consist of a bright white background that will spill into the user environment thereby causing an unintended change in user environment lighting conditions. These environment changing conditions may be identified in advance such that when the actual image data may be rendered, that video display device 300 will have already adjusted an inner frame area 310 and/or outer frame area 320 as may be appropriate such that no adverse affect or change to the user environment occurs.

It should be noted that in some embodiments of the present invention, the outer frame area 320 may always be present but simply unutilized (i.e., a neutral background color such as black). The frame area may then be 'filled' as needed in response to GPU 210 executing a drawing instruction from the CPU 206. In other embodiments, the actual graphic images to be displayed may occupy the majority of the game screen and, as such, only the inner frame area 310 may be displayed. If and when an artificial light emission is necessary from a 'halo' generated by the outer frame area 320, the software executed by the CPU 206 and otherwise controlling the display of the frame areas 310 and 320 and interacting with the image capture device 110 may cause the GPU 210 to reconfigure the game environment (e.g., re-size the game environment to fit in a small inner frame area 310) such that the outer frame area 320 may now be displayed and emit the appropriate 'halo' of artificial light.

The re-sizing of the various frame areas may occur during the course of game play (e.g., the re-sizing occurs as game play progresses). Alternatively, the re-sizing may occur only during pauses in game action such as to avoid the size of the environment and various characters changing while game play is occurring (i.e., to avoid a vertigo-type effect). Additionally, re-sizing may actually cause an automatic pause in game play with a query issued to the user as to whether re-sizing is permitted. In these instances, the amount of natural light may be sufficient to allow game play to continue but not without some processing errors. If game play deteriorates to the point that additional light is necessary, the user may be asked whether they wish to activate the illumination control feature of the present invention. If not (e.g., the user does not wish to minimize the size of the actual game environment in the inner frame area 310), the user may manually provide another source of artificial light through, for example, an overhead lamp or other light source in the actual user environment. Various user input may be provided through, for example, controller 140 in addition to other inputs such as voice-recognition.

In some embodiments, different colors or shades of colors may also be utilized to maximize the color balance of a particular user environment. For example, a user may have different light sources offering different colors of light. These varying colors may cause difficulty with the image capture device 110 processing environment information, especially with regard to color differentiation. In these instances, the image capture device 110 may identify irregularities or processing difficulties in the environment in a manner similar to the identification of a lack of sufficient light. The outer frame area 320 may used in a similar manner as to produce different colors and intensity of light to counterbalance certain overexposures in the particular environment. In some embodiments, additional frame areas may be used (e.g., a third, fourth, or fifth frame area) such that combinations of certain colors (e.g., yellow and blue individual halos to create an overall green appearance) may be implemented.

FIGS. 4A and 4B illustrate an exemplary video display device 400 reflecting different degrees of illumination intensity in the outer frame area 420 in accordance with one embodiment of the present invention. FIGS. 4A and 4B, which reflect a 'video chat' session, illustrates the lighting adjustments of a user environment described in the context of FIGS. 3A and 3B. In that regard, the inner frame area 410 of FIG. 4A reflects image data related to another participant (i.e., a remote chat participant); the outer frame area 420 is presently in a neutral background state.

In FIG. 4B, the outer frame area 420 has been 'filled' such that it now reflects white light 'halo' as referenced in the context of FIGS. 3A and 3B. The inner frame area 410 has also been reduced in that the lighting conditions in the environment of the user receiving the present image have made it necessary to increase the amount of light emitted into that environment. As such, the outer frame area 420 was expanded at the expense of the inner frame area 410.

In some embodiments of the present invention, the inner frame area 410 may need to be reduced in that the graphic data in the inner frame area 410 is inadvertently creating excess light and thereby over saturating the user environment. For example, in the aforementioned baseball game example, if the user hits a home run, the image displayed may pan upward to the sky to follow the path of the baseball as it travels toward the outskirts of the ballpark. As the scene pans toward the sky, the screen display will become predominantly white and gray (i.e., colors of the sky and clouds). These bright colors may 'spill' into the user environment, which may cause image data capture difficulties. In response to such a situation, the inner frame area 410 may decrease in size to reduce the amount of secondary light 'spillage' into the user environment. Additionally, the outer frame area 420 may be darkened to help counter suddenly excess bright light being emitted from the inner frame area 410.

Figure 5A:
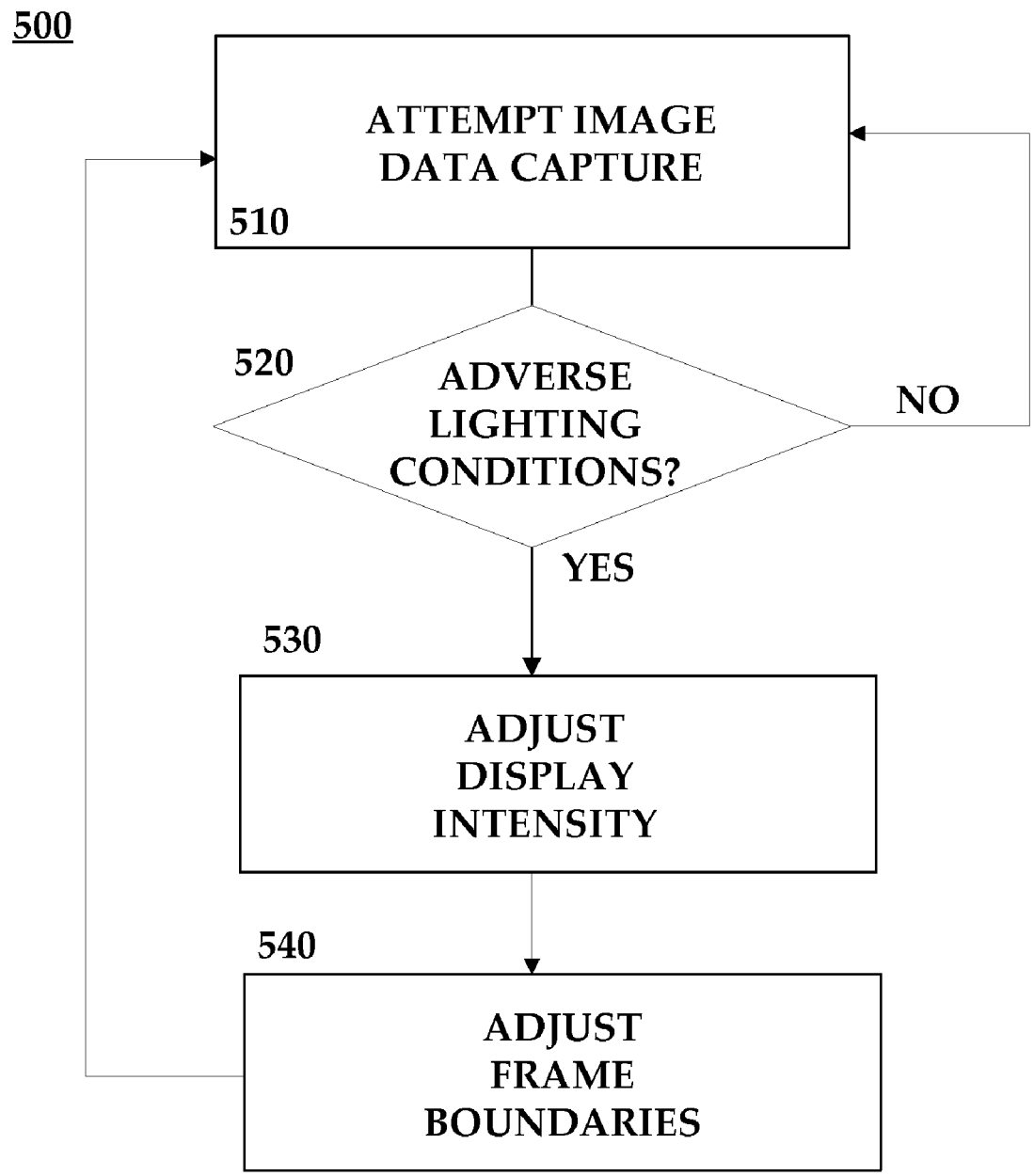
FIG. 5A illustrates an exemplary method for implementing lighting control of a user environment through varying illumination intensity in a video display device in accordance with one embodiment of the present invention.

FIG. 5A illustrates an exemplary method 500 for implementing lighting control of a user environment through varying illumination intensity in a video display device in accordance with one embodiment of the present invention.

In step 510 an image capture device may attempt to capture image data from a user environment. In step 520, a determination may be made whether adverse lighting conditions are inhibiting the processing of the image capture data or the actual capture of the data. If there are no adverse conditions present and the image data is captured and processed without incident, image data capture proceeds as necessary followed by subsequent processing of the data.

If it is determined in step 520 that adverse lighting conditions do exist, an attempt may be made to adjust display intensity in step 530. This may occur through various adjustments whereby the outer frame area may be 'filled' with a particular color and intensity of light as discussed in the context of FIGS. 3A and 3B and 4A and 4B above. If the adjustment as to display intensity is not sufficient, then (in step 540), frame image boundaries may be enlarged (or reduced as is appropriate) in order to increase or decrease the total amount of artificial light projected into the user environment.

While step 540 and the adjustment of frame boundaries is recited as following step 530 and the adjustment of light intensity, this is not to suggest the necessity of a step-by-step process. Both adjustments may occur concurrently or frame adjustment may occur prior to intensity adjustment in that FIG. 5A is an exemplary embodiment only. Regardless of the order, following the adjustment of image intensity and/or frame boundaries, further attempts at image capture and/or image data processing occur as the method repeats or continues (as is appropriate) in step 510.

Figure 5B:
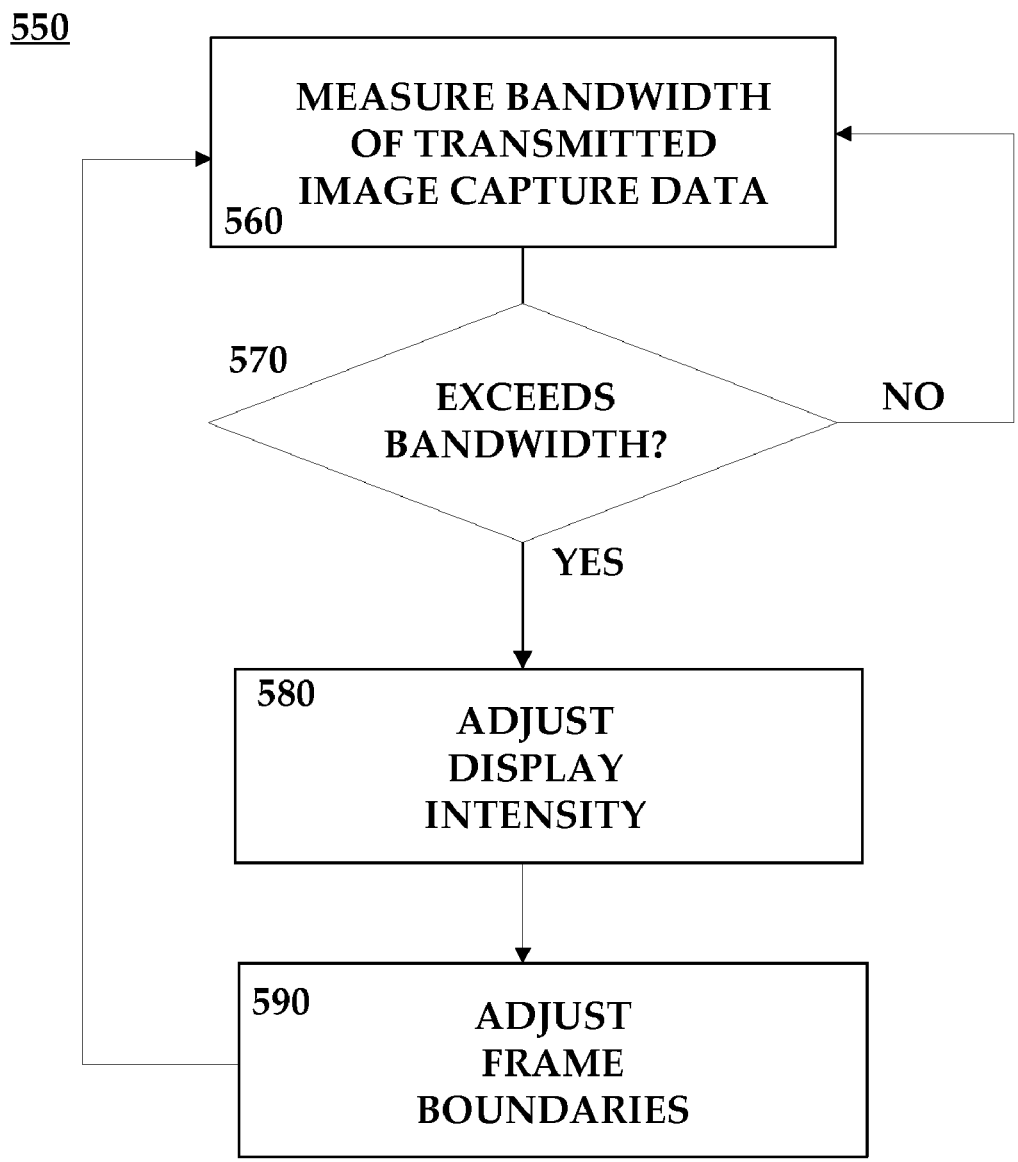
FIG. 5B illustrates an exemplary method for managing bandwidth with respect to the generation and transmission of image capture data in accordance with one embodiment of the present invention.

FIG. 5B illustrates an exemplary method 550 for managing bandwidth with respect to the generation and transmission of image capture data in accordance with one embodiment of the present invention. Specifically, FIG. 5B illustrates a method 550 for managing bandwidth through the implementation of lighting control of a user environment through, for example, varying illumination intensity in a video display device.

As discussed in U.S. patent application Ser. No. 11/624,886, the control of lighting conditions in a user environment may be associated with bandwidth and processing availability. In MPEG compression, images are represented in YUV color space (YCbCr) wherein 24-bits per pixel are present: 8-bits for luminance (Y) and 8-bits for each of the two chrominance (U), (V) elements. The chrominance information in the YUV color space data may be sub-sampled in both the horizontal and vertical direction. All of the luminance information may be retained, however, as the human eye is more sensitive to luminance information rather than chrominance information. Frames of video are subsequently divided into 16×16 macro-blocks consisting of four 8×8 luminance blocks and two 8×8 chrominance blocks (1 U and 1 V).

Each frame of video data may then be encoded as one of three types of frames: intra-frame (I-frames), forward predicted frame (P-frames), and bi-directional predicted frames (B-frames). In the case of an I-frame, the frame may be encoded as a single image with no reference to past or future frames. Further, with the exception of data quantization following the encoding of each 8×8 block from a spatial domain to a frequency domain utilizing the Discrete Cosine Transform (DCT) and the aforementioned sub-sampling, there is no lossy compression in an I-frame—especially with regard to luminosity. The other frame types—P-frames (relative a past reference frame) and B-frames (relative a past reference frame, a future reference frame or both)—refer to the I-frame. Thus, decreasing certain luminosity information in the I-frame would represent savings with regard to the all of the frames in a stream of video data.

In this regard, the image data captured from the user environment could be accepted at the lowest possible operating condition. That is, lighting controls would illuminate a user environment no more so than necessary in order to reduce the amount of luminosity data being captured, compressed and subsequently transmitted over a network. This decreased luminosity data represents not only savings in bandwidth at a transmitting computing device, a receiving computing device, and over the network backbone but can also recognize a savings with regard to processing cycles at a computing device perform digitization and compression following image capture.

Similarly, certain colors captured from a particular user environment may be captured and/or cancelled out by adjusting display emissions and/or frame boundaries as discussed above. For example, in the context of a YUV 4:4:4 environment—where Y pertains to luminance (brightness) and U and V are chrominance (color) components—each channel is expressed with 8 bits (256 possible values) and uses the same amount of space. As noted above, the human eye is most sensitive to luminance—the black and white information in picture detail. Less sensitive areas of the human eye "fill in" color. That is, color information may be reduced without the human eye noticing the same. Thus, the chrominance components (U) and (V) may be reduced without the human eye adversely noticing the same. Bandwidth consumption may be reduced by adjusting chrominance information.

For example, the environment may be effectively captured at (or manipulated to conform to) the equivalent of 4:2:2 format whereby the chroma components are sampled at half the rate of luma thereby reducing bandwidth of the signal by as much as one-third with little or no perceptible visual difference. Specifically, red and blue channels of the video signal may be half the bandwidth of the luminance information. For example, green may be cancelled out as green can be calculated from red and blue chrominance information in the context of luminance information.

A utility related to preservation of bandwidth and processing power vis-à-vis the image capture device and/or related hardware or software may be manually implemented by a user. For example, a user may recognize that their particular computing device lacks accelerated processing power or may be coupled to a low bandwidth network or, similarly, that a recipient of data captured by the image capture device suffers from similar limitations. In these instances, the user may activate such a utility to avoid bottlenecks of data.

Similarly, this preservation utility may be implemented on an as-needed basis, the need being recognized by a network congestion monitoring utility like ping, which utilizes the Internet Control Message Protocol (ICMP), and trace route, which utilizes the Uniform Datagram Protocol (UDP), to measure network response time. These and other network utilities may be implemented in various network devices (e.g., switches or routers) or through large-scale platforms like the Network Application Performance Analysis Solution (NAPAS) for Cisco Systems. Indicia of network congestion generated by these applications and solutions may be provided to a computing device operating certain software related to image capture (e.g., a client computing device or a conference management server) such that bandwidth and/or processor preservation may be activated through the manipulation of lighting conditions that are not optimal but otherwise sufficient to allow for continued image data capture.

In certain embodiments wherein one end of a video data exchange degrades a particular lighting condition for the purposes of improved processing or transmission time, the recipient of that data may adjust the incoming video data such that it does not appear as lesser quality image data. For example, the incoming video data may be pre-processed such that luminance that was degraded by the sender of the data may be artificially amplified by the recipient through editing or video pre-processing editing software that automatically adjusts the data as it is decoded and rendered.

In step 560, the bandwidth being consumed by image capture data transmitted over a network (as may occur in the context of a video chat session like that described in FIG. 6 below) is made. A determination of bandwidth may be made utilizing, for example, the aforementioned NAPAS or simpler methodologies such as ping and trace route. The determination may occur at the transmitting computing device, at the receiving computing device, or at some intermediate computing device or at some other point in a communications network. The information may then be provided to the transmitting device such that it may adjust its image capture operations as is appropriate and is discussed in the context of steps 580 and 590. Alternatively, another device may make certain determination as to bandwidth consumption and provide instructions to the transmitting computing device such that it may responsively adjust its image capture operations as may occur through screen and/or frame adjustment.

In step 570, a determination is made as to whether image capture data that is being transmitted over a network exceeds a particular bandwidth limitation. The particular bandwidth may be a static predetermined amount (e.g., a target threshold). That static threshold may be manually set by a user or network administrator. The static threshold may also be identified at the outset of a chat session and remain constant throughout the session. Alternatively, the amount may be determined in the context of a particular video chat session and may change during the course of the chat session. That is, as network conditions change from the beginning to the end of the session and at various points in between, the target threshold may be adjusted subject to those changing network conditions.

In one example, two users chatting over a dedicated corporate network for such communications may be unlikely to encounter other users or applications attempting to utilize the same finite amount of bandwidth in the network. As such, even if captured image data consumes large amounts of bandwidth, the availability of large amounts of network overhead may obviate the need to otherwise adjust network traffic consumption. On the other hand, if two users are chatting over a public network shared by other users at a peak traffic time, even image capture data that is 'normal' under the circumstances may exceed a particular bandwidth allotment or may otherwise encounter transmission difficulties due to other users and applications sharing the network. Further, if a chat session commences amongst a group of fifteen participants, bandwidth consumption may initially be high with respect to the group and available resources. As participants drop out of the conference (e.g., their presence is no longer required), the total bandwidth consumption may decease and what constitutes an excessive use of bandwidth for any one user may change as additional resources become available to the session.

If a determination is made that image capture data does not exceed a particular bandwidth (either predetermined or determined in a dynamic fashion), then measurement continues in step 560. Measurement of bandwidth consumption may occur at predetermined times during the chat session (e.g., every five minutes). Measurement may also occur upon the occurrence of a particular event, for example, transmission of the I-frame or every $n^{th}$ I-frame. When and how often measurement occurs may also be set by the user or a network administrator.

If it is determined that image capture data being transmitted over the network exceeds a particular bandwidth limitation, adjustment of display intensity and frame boundaries may occur in steps 580 and 590. These particular adjustments may be similar with respect to the display and frame adjustments that occurred in steps 530 and 540 in the context of FIG. 5A. Like FIG. 5A, adjustment of display intensity and frame boundaries are not necessarily a step-by-step process. Both adjustments may occur concurrently or frame adjustment may occur prior to intensity adjustment. Further, only one particular adjustment (i.e., frame but not display) may occur.

Lighting adjustment sources other than or in addition to the screen and a frame area within the screen may be utilized in the context of managing bandwidth consumed by image capture data. For example, an external light source may be coupled to a device controlling lighting emissions (e.g., client computing device 130 of FIG. 1). This coupling may occur in the context of a USB connection or other data connection. The external lighting device may be proximate to or otherwise remote from the actual image capture device and related computing device so long as the light source may be configured to result in some influence of the lighting conditions of a particular user environment. Some lighting control hardware may be integrated with particular display device such as a backlight or other ambient light projector.

FIG. 6 illustrates an exemplary network 600 of real-time, three-dimensional, interactive environment data generating systems 610/620 as may be utilized in a 'video chat' session or interactive video game and in accordance with one embodiment of the present invention. Systems 610/620 exchange data over communications network 630. Optional conferencing management server 640 may facilitate exchanges between systems 610/620 during the course of a chat or game play session.

Systems 610/620 may comprise an exemplary system like that disclosed in FIG. 1. In that regard, such a system may comprise an image capture device, a video display device, and a client computing device having processor functionality. Systems 610/620 would be placed in the context of a user environment, such as a living room or a conference room, which would be located within the field-of-view of the image capture device.

Systems 610/620 may each be running software for facilitating a video-conference or video 'chat' session or otherwise related to a particular video game involving image data capture. The exchange of data between systems 610/620 may be limited to video images and accompanying audio. The session may further comprise additional ancillary data such as textual exchanges (e.g., closed captioning); various in-conference applications such as an enterprise application allowing for collaborative development between multiple users (e.g., a word processing document or presentation slide); video-games that may be played on-line during the session; or other multi-media applications (e.g., a media player). These data exchanges are in addition to various session protocols related to establishing and maintaining the exchange of conferencing and other related data.

Through the aforementioned software, which may be accessed through optical disk control unit 228, the network adaptor 240 may initiate a conferencing session through, for example, Ethernet connection 242 over the aforementioned network 630. Image data (and related audio data) may be captured through the aforementioned image capture device, which may be coupled to the system 610 via, for example, USB interface 220. GPU 210, in turn, executes various drawing instructions related to not only the actual conferencing data (e.g., user images) but also the inner frame area and outer frame area and related illumination control commands (e.g., 'filling' the outer frame with a particular intensity and color) whereby lighting conditions of a particular environment may be controlled. Instructions related to control of lighting conditions in the particular environment may be a part of the video conferencing software executed by each system 610/620 or at server 640.

Systems 610/620 may also be configured to manage bandwidth consumption based on certain bandwidth measurements taken by each system 610/620. Bandwidth measurements may also be taken by a third-party application or remote computing device (e.g., server 640) and reported to each system 610/620. Systems 610/620 may adjust certain lighting conditions through screen and frame adjustments in response to local determinations made with respect to network conditions and bandwidth consumption. Alternatively, systems 610/620 may be configured to receive instructions from a remote computing device such as server 640 or another conference participant's computing device and adjust certain user environment lighting conditions in response to the same.

In some embodiments of the present invention, address book data may be stored on a removable data storage device as may be accessed through memory card interface 218. This address book data may be related to other users of the present video-conferencing/chat system 600. The conferencing software may also include certain security features or parental controls to ensure that under-age children do not access the system 600 or are limited to sessions with particular, pre-approved conferees. Such information may also be stored on the aforementioned memory device. Conferencing software may further facilitate the generation of video mail such as a 30-second full-motion video. Software may further facilitate entry into various chat-rooms or interaction with certain applications, such as video games.

Communications network 630 comprises various communications facilities and mediums (e.g., telephony, wireless, satellite, cable, optic, and so forth) as may be provided by telecommunications companies and Internet Service Providers. Communications network 630 may be a geographically widespread network (e.g., a Wide Area Network (WAN)), like the Internet that depends upon the aforementioned communications facilities to link various network segments. In that regard, a WAN may ultimately be comprised of smaller linked communications networks such as Local Area Networks (LANs). A LAN is typically comprised of a group of computers and other devices dispersed over a relatively limited area and connected by, for example, a variety of broadband communications links. LANs may take on a variety of configurations including server client, peer-to-peer, peer groups, or a combination of the same. Communications network 630 may also be a closed, proprietary network.

In some embodiments of the present invention, a conferencing management server 640 may be utilized to conduct various video conferences or other user interactions. For example, system 610 may actually connect with server 640; server 640 will then create a connection with system 620 and a 'chat' session may commence. Server 640 may provide various network controls such as connection acceptance, session initiation and termination, bandwidth management, conference recording (e.g., recording the conference session or a transcript of the same for future access); managing chat rooms or group sessions (e.g., sessions involving more than two participants); facilitating certain data exchanges ancillary to the actual conference (e.g., documents, presentations, video games); and also ensuring proper control of lighting conditions in a particular user environment.

In the latter example, the server 640 may monitor lighting conditions in the conferencing environment of each system (610/620) and adjust certain frame settings through the necessary drawing instructions such that proper lighting conditions are maintained at both ends of the conference. In this regard, server 640 may actually provide the drawing instructions for execution by the appropriate system to 'fill' a frame or adjust the size of the same. Server 640 may also receive various indications from each system (610/620) concerning the quality of lighting conditions at the other system (610/620) and facilitate adjustments as is appropriate by communicating the various indications to various participant devices.

Server 640 may also manage bandwidth consumption in a similar fashion through the control of lighting conditions in various user environments. Server 640 may include a bandwidth measurement application for measuring such conditions and responding in an according fashion (i.e., adjusting lighting conditions in a user environment through screen and/or frame adjustments). Server 640 may, alternatively, receive information from each system (610/620) or a third-party application in the communications network 630 concerning various network conditions and bandwidth consumption of the same. Measure of bandwidth conditions may occur over a network 630, at the origin and/or destination of video conference/chat information, at the server 640, as well as at and between various hops in network 630. Server 640 may adjust lighting conditions to allow for bandwidth consumption control in response to a measurement at one or more points in the network 630 as may be deemed appropriate in response to certain measurement information.

Server 640 may also host the necessary software for the conference to take place. In such an instance, the systems 610/620 may comprise only minimal application data necessary to contact the server 640 to indicate the desire to participate in a conference session. Critical conferencing architecture software and execution of the same may then occur at the server 640, which may have considerably more processing power than the end-user device (e.g., an entertainment system). By leaving heavy processing to the more powerful conferencing server (like server 640), conferencing exchanges do not 'slow down' or experience jitter due to processing delays at the various end-users and their related computing devices. In some embodiments of the present invention, like those utilizing a high speed processing model as disclosed in U.S. patent publication number 2002-0138637 for a "Computer Architecture and Software Cells for Broadband Networks," server 640 may also manage various distributed computing operations.

While the present invention has been described with reference to exemplary embodiments, it will be understood by those skilled in the art that various changes may be made and equivalents may be substituted for elements thereof without departing from the true spirit and scope of the present invention. In addition, modifications may be made without departing from the essential teachings of the present invention. Various alternative systems may be utilized to implement the various methodologies described herein and various methods may be used to achieve certain results from the aforementioned systems. Certain methodologies and benefits discussed in the context of lighting control of a user environment for detection of user interactions may be equally as applicable to controlling bandwidth consumption with respect to captured and transmitted image data and vice versa.

The steps of the processes disclosed herein and various alternatives of the same may be embodied in hardware or software. Such embodiments may include a computer-readable medium such as an optical disc, memory card, carrier waves, and the like. Such mediums may include instructions executable by the processor of a computing device.

What is claimed is:

1. A method for implementing lighting control of a user environment, the method comprising:
   capturing image data from a user environment via an image capture device, wherein the image data includes data about a real-world activity performed by a user interacting with a game environment, and wherein the image capture device is associated with a display device for implementing lighting control of the user environment; and
   executing instructions stored in memory wherein execution of instructions by a processor:
      determines that an adverse lighting condition exists, the adverse lighting condition preventing proper data capture by the image capture device; and
      adjusts a lighting intensity of the display device for proper data capture in response to the adverse lighting condition, wherein adjusting the lighting intensity includes increasing or decreasing a total amount of light projected into the user environment by the display device and wherein adjusting the lighting intensity of the display device includes adjusting the size of an inner frame area or outer frame area, the display device having an inner frame area and an outer frame area for use in implementing lighting control of the user environment.

2. The method of claim 1 wherein the user performs the real-world activity using a prop device.

3. The method of claim 1, wherein adjusting the lighting intensity of the display device occurs during game play.

4. The method of claim 3, wherein adjusting the lighting intensity of the display device occurs following a user approval of the intended adjustment.

5. The method of claim 1, wherein adjusting the intensity of the display device includes adjusting the color of the projected light to maximize the color balance of the user environment.

6. The method of claim 5, wherein adjusting the color of the projected light includes muting, countering, or cancelling the color.

7. The method of claim 1, further comprising calibrating the lighting intensity of the user environment to determine a lighting control condition in the user environment.

8. A method for implementing lighting control of a user environment, the method comprising:
   capturing image data from a user environment via an image capture device, wherein the image data includes data about a real-world activity performed by a user interacting with a game environment, and wherein the image capture device is associated with a display device for implementing lighting control of the user environment; and
   executing instructions stored in memory wherein execution of instructions by a processor:
      determines that an adverse lighting condition exists, the adverse lighting condition preventing proper data capture by the image capture device; and
      adjusts a lighting intensity of the display device for proper data capture in response to the adverse lighting condition, wherein adjusting the lighting intensity includes increasing or decreasing a total amount of light projected into the user environment by the display device and wherein adjusting the lighting intensity of the display device includes adjusting the orientation of the inner frame area or outer frame area of the display device.

9. The method of claim 8, wherein the user performs the real-world activity using a prop device.

10. The method of claim 8, wherein adjusting the lighting intensity of the display device occurs during game play.

11. The method of claim 10, wherein adjusting the lighting intensity of the display device occurs following a user approval of the intended adjustment.

12. The method of claim 8, wherein adjusting the intensity of the display device includes adjusting the color of the projected light to maximize the color balance of the user environment.

13. The method of claim 12, wherein adjusting the color of the projected light includes muting, countering, or cancelling the color.

14. The method of claim 8, further comprising calibrating the lighting intensity of the user environment to determine a lighting control condition in the user environment.

15. A method for implementing lighting control of a user environment, the method comprising:
   capturing image data from a user environment via an image capture device, wherein the image data includes data about a real-world activity performed by a user interacting with a game environment, and wherein the image capture device is associated with a display device for implementing lighting control of the user environment; and
   executing instructions stored in memory wherein execution of instructions by a processor:
      determines that an adverse lighting condition exists, the adverse lighting condition preventing proper data capture by the image capture device; and
      adjusts a lighting intensity of the display device for proper data capture in response to the adverse lighting condition, wherein adjusting the lighting intensity includes increasing or decreasing a total amount of light projected into the user environment by the display device and wherein adjusting the lighting intensity of the display device further includes adding an additional frame area.

16. The method of claim 15, wherein the user performs the real-world activity using a prop device.

17. The method of claim 15, wherein adjusting the lighting intensity of the display device occurs during game play.

18. The method of claim 17, wherein adjusting the lighting intensity of the display device occurs following a user approval of the intended adjustment.

19. The method of claim 15, wherein adjusting the intensity of the display device includes adjusting the color of the projected light to maximize the color balance of the user environment.

20. The method of claim 19, wherein adjusting the color of the projected light includes muting, countering, or cancelling the color.

21. The method of claim 15, further comprising calibrating the lighting intensity of the user environment to determine a lighting control condition in the user environment.

22. A system for implementing lighting control of a user environment, comprising:
   an image capture device for capturing image data from a user environment, wherein the image data includes data about a real-world activity performed by a user interacting with a game environment;
   a computing device that:
      determines that an adverse lighting condition exists, the adverse lighting condition preventing proper data capture by the image capture device, and
      adjusts a lighting intensity of the display device for proper data capture in response to the adverse lighting condition, wherein adjusting the lighting intensity includes increasing or decreasing a total amount of light projected into the user environment by the display device; and
   a display device that displays image data received from the computing device and projects light into the user environment, wherein the display device includes an inner frame area and an outer frame area for implementing lighting control of the user environment.

23. The system of claim 22, wherein the image capture device is associated with a prop device for interacting with the game environment, the user using the prop device to perform the real-world activity.

24. The system of claim 22, wherein the image capture device is configured to track the prop device and translate the real-world activity performed by the user into on-screen display data.

25. The system of claim 22, further comprising a lighting source external to the display device for projecting additional light into the user environment.

26. The system of claim 22, wherein the computing device adjusts the lighting intensity of the display device by adjusting the color of the projected light to maximize the color balance of the user environment.

27. A system for implementing lighting control of a user environment, comprising:
   an image capture device for capturing image data from a user environment, wherein the image data includes data about a real-world activity performed by a user interacting with a game environment;
   a computing device that:
      determines that an adverse lighting condition exists, the adverse lighting condition preventing proper data capture by the image capture device, and
      adjusts a lighting intensity of the display device for proper data capture in response to the adverse lighting condition, wherein adjusting the lighting intensity includes increasing or decreasing a total amount of light projected into the user environment by the display device; and
   a display device that displays image data received from the computing device and projects light into the user environment, wherein the image data is displayed in the inner frame area.

28. The system of claim 27, wherein the image capture device is associated with a prop device for interacting with the game environment, the user using the prop device to perform the real-world activity.

29. The system of claim 28, wherein the image capture device is configured to track the prop device and translate the real-world activity performed by the user into on-screen display data.

30. The system of claim 27, further comprising a lighting source external to the display device for projecting additional light into the user environment.

31. The system of claim 27, wherein the computing device adjusts the lighting intensity of the display device by adjusting the color of the projected light to maximize the color balance of the user environment.

32. A system for implementing lighting control of a user environment, comprising:
   an image capture device for capturing image data from a user environment, wherein the image data includes data about a real-world activity performed by a user interacting with a game environment;
   a computing device that:
      determines that an adverse lighting condition exists, the adverse lighting condition preventing proper data capture by the image capture device, and
      adjusts a lighting intensity of the display device for proper data capture in response to the adverse lighting condition, wherein adjusting the lighting intensity includes increasing or decreasing a total amount of light projected into the user environment by the display device; and
   a display device that displays image data received from the computing device and projects light into the user environment, wherein a portion of the inner frame area or outer frame area is subdivided into subsections, each subsection subject to lighting control.

33. The system of claim 32, wherein the image capture device is associated with a prop device for interacting with the game environment, the user using the prop device to perform the real-world activity.

34. The system of claim 33, wherein the image capture device is configured to track the prop device and translate the real-world activity performed by the user into on-screen display data.

35. The system of claim 32, further comprising a lighting source external to the display device for projecting additional light into the user environment.

36. The system of claim 32, wherein the computing device adjusts the lighting intensity of the display device by adjusting the color of the projected light to maximize the color balance of the user environment.

* * * * *